(12) United States Patent
Nishibe et al.

(10) Patent No.: US 11,749,141 B2
(45) Date of Patent: Sep. 5, 2023

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Mitsuru Nishibe, Chiba (JP); Atsushi Ishihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 17/278,817

(22) PCT Filed: Sep. 2, 2019

(86) PCT No.: PCT/JP2019/034353
§ 371 (c)(1),
(2) Date: Mar. 23, 2021

(87) PCT Pub. No.: WO2020/071029
PCT Pub. Date: Apr. 9, 2020

(65) Prior Publication Data
US 2022/0036779 A1 Feb. 3, 2022

(30) Foreign Application Priority Data

Oct. 4, 2018 (JP) .................................. 2018-189081

(51) Int. Cl.
*G09G 3/00* (2006.01)
*G06T 7/20* (2017.01)
*G02B 27/01* (2006.01)

(52) U.S. Cl.
CPC .............. *G09G 3/002* (2013.01); *G06T 7/20* (2013.01); *G02B 27/017* (2013.01); *G09G 2340/0464* (2013.01); *G09G 2354/00* (2013.01); *G09G 2360/144* (2013.01); *G09G 2360/145* (2013.01)

(58) Field of Classification Search
CPC .............. G06T 7/20; G09G 2340/0464; G09G 2354/00; G09G 2360/144; G09G 2360/145; G09G 3/002; G02B 27/017
See application file for complete search history.

(56) References Cited

U.S. PATENT DOCUMENTS

| 2014/0375679 | A1 | 12/2014 | Margolis et al. |
| 2018/0061121 | A1 | 3/2018 | Yeoh et al. |
| 2021/0278665 | A1* | 9/2021 | Jeon ........................ G06F 3/012 |

FOREIGN PATENT DOCUMENTS

| EP | 3352050 A1 | 7/2018 |
| JP | 2013-065991 A | 4/2013 |
| JP | 2018-503114 A | 2/2018 |
| WO | WO 2017/183346 A1 | 10/2017 |

* cited by examiner

*Primary Examiner* — Roy P Rabindranath
(74) *Attorney, Agent, or Firm* — Paratus Law Group, PLLC

(57) ABSTRACT

An information processing apparatus including an acquisition unit configured to acquire first information regarding relative movement between a viewpoint and display information, and second information regarding a light emission period for presentation of the display information to a display region, and a control unit configured to cause the display information to be presented in the display region on the basis of the first information and the second information, in which the control unit corrects a presentation position of the display information in the display region according to the relative movement between the viewpoint and the display information in the light emission period.

16 Claims, 16 Drawing Sheets

INFORMATION PROCESSING APPARATUS, INFORMATION PROCESSING METHOD, AND RECORDING MEDIUM

CROSS REFERENCE TO PRIOR APPLICATION

This application is a National Stage Patent Application of PCT International Patent Application No. PCT/JP2019/034353 (filed on Sep. 2, 2019) under 35 U.S.C. § 371, which claims priority to Japanese Patent Application No. 2018-189081 (filed on Oct. 4, 2018), which are all hereby incorporated by reference in their entirety.

TECHNICAL FIELD

The present disclosure relates to an information processing apparatus, an information processing method, and a recording medium.

BACKGROUND ART

In recent years, the advancement of image recognition technology has enabled recognition of the position and orientation of a real object (that is, an object in a real space) included in an image captured by an imaging device. As one of applications of such object recognition, there is a technology called augmented reality (AR). By using the AR technology, virtual content (hereinafter, referred to as "virtual object") in various modes such as text, icons, and animations can be superimposed on an object in the real space (hereinafter referred to as "real object") and a superimposed image can be presented to a user. For example, Patent Document 1 discloses an example of a technology of presenting virtual content to a user using the AR technology.

An example of a method of presenting information to the user using the AR technology includes a method of using a so-called transmission-type display. Specifically, the transmission-type display is supported in front of the user's eyes, and display information (for example, a display image) is presented on the display, so that the user can visually recognize an image in which the display information is superimposed on an optical image of the real space.

CITATION LIST

Patent Document

Patent Document 1: International Publication No. 2017/183346

SUMMARY OF THE INVENTION

Problems to be Solved by the Invention

By the way, under a situation where information is presented using an output unit such as a display, the brightness (illuminance) of a surrounding environment may affect the visibility of the presented display information. As a specific example, under conditions where the illuminance of the surrounding environment can change, even if the display information is presented with the same brightness, the visibility of the presented display information is lower when the illuminance is relatively high such as outdoors than when the illuminance is relatively low such as indoors, resulting in having a difficulty in visual recognition. From such a background, a display capable of improving the visibility of the display information by controlling a light emission period regarding presentation of the display information and controlling the brightness of the display information to be visibility recognized by the user has been proposed, for example.

Meanwhile, there are some cases where a presentation position of the display information is perceived to deviate from an actually presented position by the user with the control of the light emission period regarding presentation of the display information. In particular, under the situation where the display information is superimposed on the real object and presented to the user using the AR technology, the deviation of the presentation position of the display information as described above tends to be easily perceived by the user.

Therefore, the present disclosure proposes a technology that enables presentation of display information in a more favorable mode even under a situation where a light emission period regarding the presentation of the display information may change.

Solutions to Problems

According to the present disclosure, provided is an information processing apparatus including: an acquisition unit configured to acquire first information regarding relative movement between a viewpoint and display information, and second information regarding a light emission period for presentation of the display information to a display region; and a control unit configured to cause the display information to be presented in the display region on the basis of the first information and the second information, in which the control unit corrects a presentation position of the display information in the display region according to the relative movement between the viewpoint and the display information in the light emission period.

Furthermore, according to the present disclosure, provided is an information processing method including: by a computer, acquiring first information regarding relative movement between a viewpoint and display information, and second information regarding a light emission period for presentation of the display information to a display region; and causing the display information to be presented in the display region on the basis of the first information and the second information, in which a presentation position of the display information in the display region is corrected according to the relative movement between the viewpoint and the display information in the light emission period.

Furthermore, according to the present disclosure, provide is a recording medium in which a program is recorded, the program for causing a computer to execute: acquiring first information regarding relative movement between a viewpoint and display information, and second information regarding a light emission period for presentation of the display information to a display region; and causing the display information to be presented in the display region on the basis of the first information and the second information, in which a presentation position of the display information in the display region is corrected according to the relative movement between the viewpoint and the display information in the light emission period.

Furthermore, according to the present disclosure, provided is an information processing apparatus including: a display control unit configured to control a display unit having optical transparency of a head-mounted display device such that a virtual object is located on the display unit at a predetermined absolute coordinate in a real space as viewed from a user who wears the display device, and an illuminance information acquisition unit configured to acquire information regarding illuminance of external light from an illuminance sensor, in which the display control unit controls the display unit such that a light emission period becomes longer as the illuminance of the external light is higher, in a case where the virtual object moves toward one direction in a display region of the display unit, the display control unit displays the virtual object at a first position in the display region as viewed from the user in a case where the illuminance of the external light is first illuminance, and displays the virtual object at a second position on a side of the one direction with respect to the first position in the display region in the horizontal direction as viewed from the user in a case where the illuminance of the external light is second illuminance higher than the first illuminance.

Effect of the Invention

As described above, according to the present disclosure, a technology that enables presentation of the display information in a more favorable mode even under the situation where the light emission period regarding the presentation of the display information may change is provided.

Note that the above-described effect is not necessarily restrictive, and any one of effects described in the present specification or any another effect obtainable from the present specification may be exhibited in addition to or in place of the above-described effect.

MODE FOR CARRYING OUT THE INVENTION

A favorable embodiment of the present disclosure will be described in detail with reference to the appended drawings. Note that, in the present specification and drawings, redundant description of configuration elements having substantially the same functional configuration is omitted by providing the same sign.

Note that the description will be given in the following order.

1. Outline
1.1. Schematic Configuration
1.2. Configuration of Input/Output Device
1.3. Principle of Self-Position Estimation
2. Examination of Display Control According to Change in Brightness of Surrounding Environment
3. Technical Characteristics
3.1. Basic Principle
3.2. Functional Configuration
3.3. Processing
3.4. Modification
3.4.1. First Modification: Application to Scan Line Light Emission
3.4.2. Second Modification: Example of Control Assuming movement of Display Information
4. Hardware Configuration
4.1. Configuration Example as Independently Operable Device
4.2. Configuration Example when Implementing Information Processing Apparatus as Chip
5. Conclusion

1. OUTLINE

<1.1. Schematic Configuration>

Figure 1:
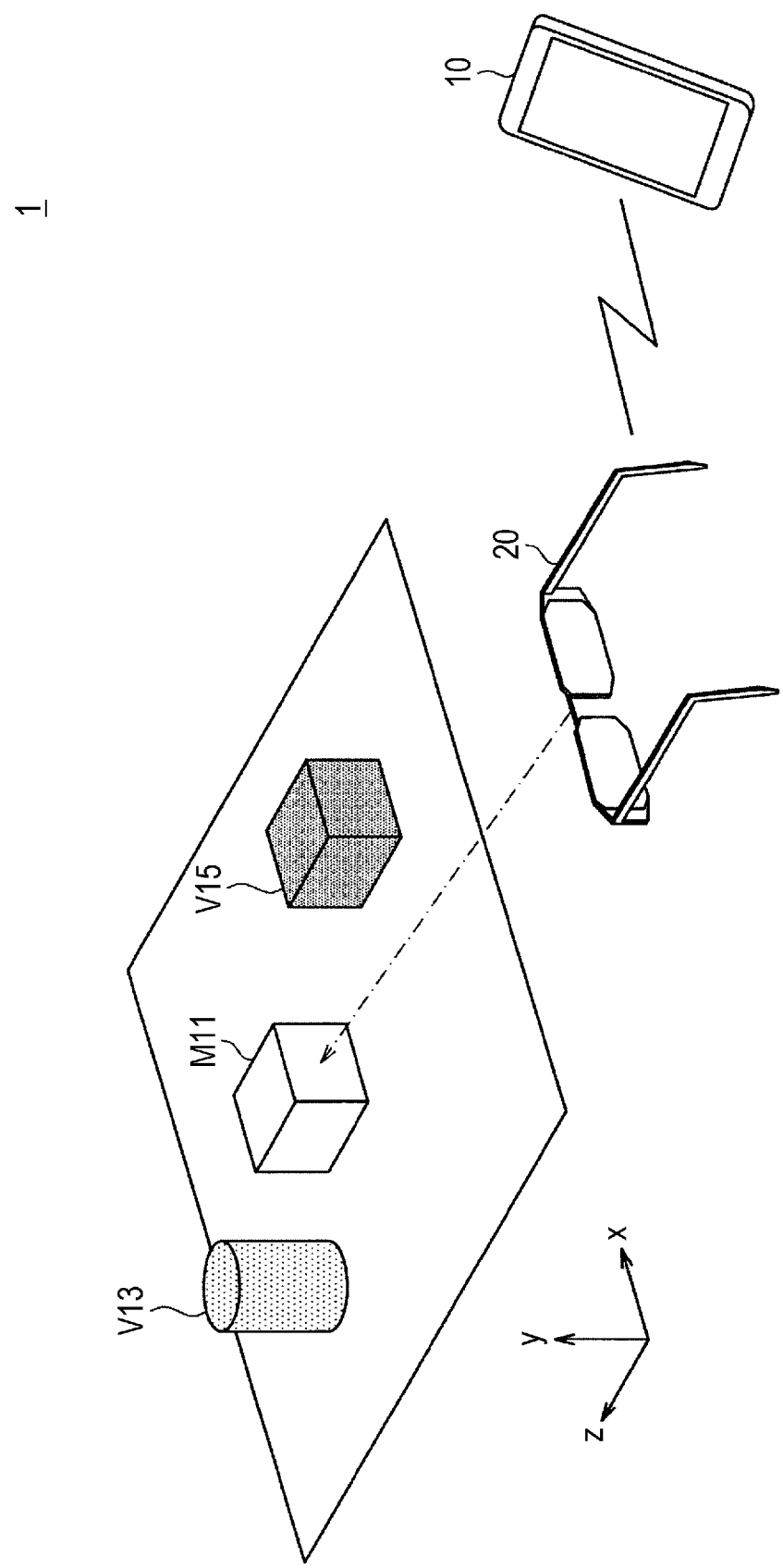
FIG. 1 is an explanatory view for describing an example of a schematic configuration of an information processing system according to an embodiment of the present disclosure.

First, an example of a schematic configuration of an information processing system according to an embodiment of the present disclosure will be described with reference to FIG. 1. FIG. 1 is an explanatory view for describing an example of a schematic configuration of an information processing system according to an embodiment of the present disclosure. In FIG. 1, reference numeral M11 schematically represents an object (that is, a real object) located in a real space. Furthermore, reference numerals V13 and V15 schematically represent virtual content (that is, virtual objects) presented to be superimposed in the real space. In other words, an information processing system 1 according to the present embodiment superimposes the virtual objects on an object in the real space such as the real object M11 on the basis of a so-called augmented reality (AR) technology, for example, and presents the superimposed objects to a user. Note that, in FIG. 1, both the real object and the virtual objects are presented for easy understanding of characteristics of the information processing system according to the present embodiment.

As illustrated in FIG. 1, an information processing system 1 according to the present embodiment includes an information processing apparatus 10 and an input/output device 20. The information processing apparatus 10 and the input/output device 20 are able to transmit and receive information to and from each other via a predetermined network. Note that the type of network connecting the information processing apparatus 10 and the input/output device 20 is not particularly limited. As a specific example, the network may be configured by a so-called wireless network such as a network based on a Wi-Fi (registered trademark) standard. Furthermore, as another example, the network may be configured by the Internet, a dedicated line, a local area network (LAN), a wide area network (WAN), or the like. Furthermore, the network may include a plurality of networks, and at least a part of the networks may be configured as a wired network. Furthermore, the information processing apparatus 10 may be a device configured to be able to communicate with another device via a wireless communication path such as a smartphone or the like. In this case, the input/output device 20 may be configured as, for example, a wearable display provided as an accessory of the smartphone. That is, the input/output device 20 is a device (for example, a wearable device) that operates in conjunction with the information processing apparatus 10 by being connected to the information processing apparatus 10 configured as a smartphone or the like via the above-described network.

The input/output device 20 is a configuration for obtaining various types of input information and presenting various types of output information to the user who holds the input/output device 20. Furthermore, the presentation of the output information by the input/output device 20 is controlled by the information processing apparatus 10 on the basis of the input information acquired by the input/output device 20. For example, the input/output device 20 acquires, as the input information, information for recognizing the real object M11, and outputs the acquired information to the information processing apparatus 10. The information processing apparatus 10 recognizes the position of the real object M11 (that is, absolute coordinates of the real object M11) in the real space on the basis of the information acquired from the input/output device 20, and causes the input/output device 20 to present the virtual objects V13 and V15 on the basis of the recognition result. With such control, the input/output device 20 can present, to the user, the virtual objects V13 and V15 such that the virtual objects V13 and V15 are superimposed on the real object M11 on the basis of the so-called AR technology. Note that, in FIG. 1, the input/output device 20 and the information processing apparatus 10 are illustrated as devices different from each other. However, the input/output device 20 and the information processing apparatus 10 may be integrally configured. Furthermore, details of the configurations and processing of the input/output device 20 and the information processing apparatus 10 will be separately described below.

An example of the schematic configuration of the information processing system according to the embodiment of the present disclosure has been described with reference to FIG. 1.

<1.2. Configuration of Input/Output Device>

Figure 2:
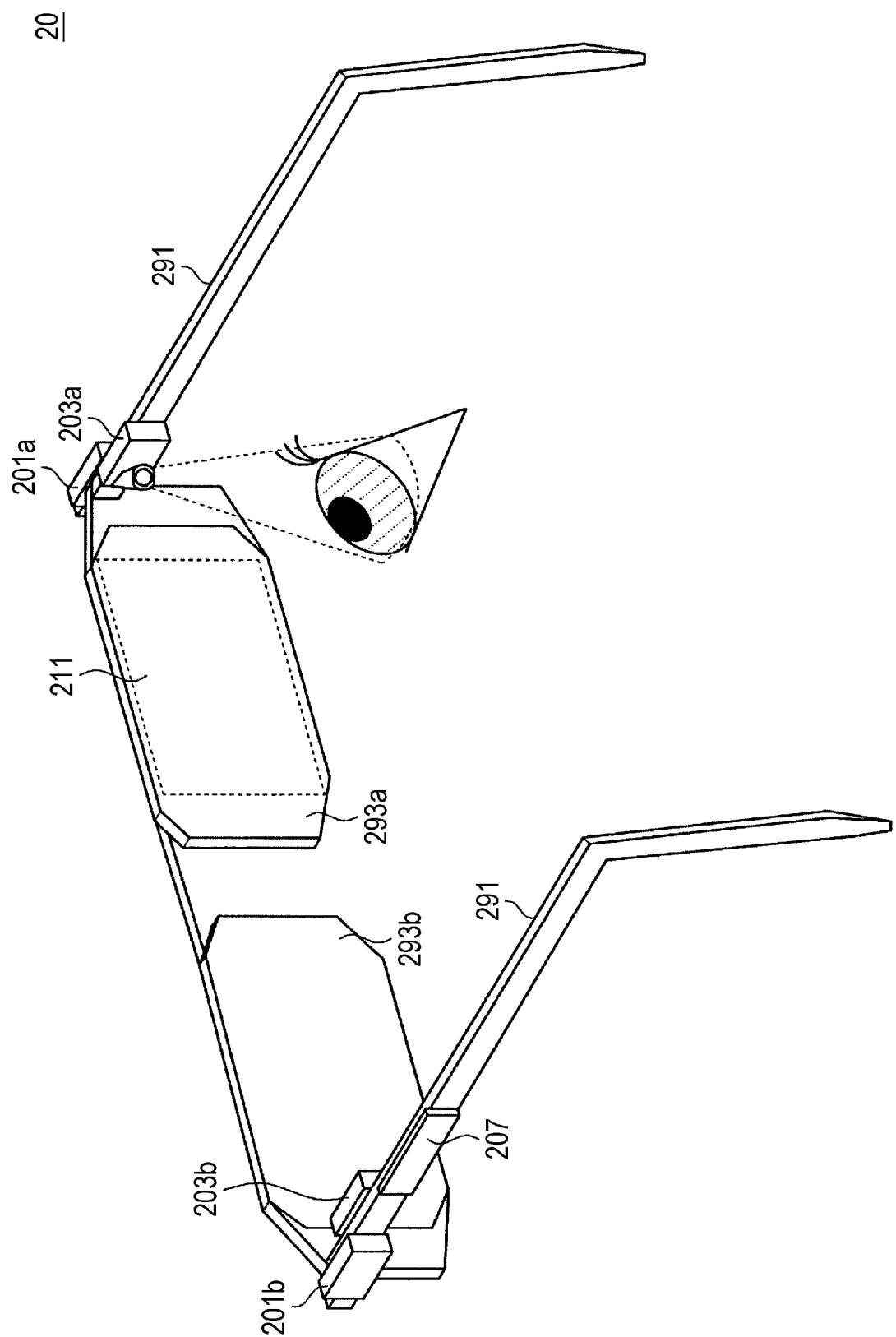
FIG. 2 is an explanatory view for describing an example of a schematic configuration of an input/output device according to the present embodiment.

Next, an example of a schematic configuration of the input/output device 20 according to the present embodiment illustrated in FIG. 1 will be described with reference to FIG. 2. FIG. 2 is an explanatory view for describing an example of a schematic configuration of the input/output device according to the present embodiment.

The input/output device 20 according to the present embodiment is configured as a so-called head-mounted device mounted on at least part of the head of the user and used by the user. For example, in the example illustrated in FIG. 2, the input/output device 20 is configured as a so-called eyewear-type (glasses-type) device, and at least either a lens 293a or a lens 293b is configured as a transmission-type display (output unit 211). Furthermore, the input/output device 20 includes first imaging units 201a and 201b, second imaging units 203a and 203b, an operation unit 207, and a holding unit 291 corresponding to a frame of the glasses. The holding unit 291 holds the output unit 211, the first imaging units 201a and 201b, the second imaging units 203a and 203b, and the operation unit 207 to have a predetermined positional relationship with respect to the head of the user when the input/output device 20 is mounted on the head of the user. Furthermore, although not illustrated in FIG. 2, the input/output device 20 may be provided with a sound collection unit for collecting a voice of the user.

Here, a more specific configuration of the input/output device 20 will be described. For example, in the example illustrated in FIG. 2, the lens 293a corresponds to a lens on a right eye side, and the lens 293b corresponds to a lens on a left eye side. In other words, the holding unit 291 holds the output unit 211 such that the output unit 211 (in other words, the lenses 293a and 293b) is located in front of the eyes of the user in the case where the input/output device 20 is worn by the user. In other words, the holding unit 291 supports the output unit 211 so as to be located in front of the user's eyes. That is, the holding unit 291 corresponds to an example of a "support unit".

The first imaging units 201a and 201b are configured as so-called stereo cameras and are held by the holding unit 291 to face a direction in which the head of the user is directed (in other words, the front of the user) when the input/output device 20 is mounted on the head of the user. At this time, the first imaging unit 201a is held near the user's right eye, and the first imaging unit 201b is held near the user's left eye. The first imaging units 201a and 201b capture a subject (in other words, the real object located in the real space) located in front of the input/output device 20 from different positions from each other on the basis of such a configuration. Thereby, the input/output device 20 acquires images of the subject located in front of the user and can calculate a distance to the subject from the input/output device 20 on the basis of a parallax between the images respectively captured by the first imaging units 201a and 201b. Note that, in the present disclosure, description of "image" can include "still image" and "moving image" unless otherwise specified.

Note that the configuration and method are not particularly limited as long as the distance between the input/output device 20 and the subject can be measured. As a specific example, the distance between the input/output device 20 and the subject may be measured on the basis of a method such as multi-camera stereo, moving parallax, time of flight (TOF), or structured light. Here, the TOF is a method of obtaining an image (so-called distance image) including a distance (depth) to a subject on the basis of a measurement result by projecting light such as infrared light on the subject and measuring a time required for the projected light to be reflected by the subject and return, for each pixel. Furthermore, the structured light is a method of obtaining a distance image including a distance (depth) to a subject on the basis of a change in a pattern obtained from an imaging result by irradiating the subject with the pattern of light such as infrared light and capturing the pattern. Furthermore, the moving parallax is a method of measuring a distance to a subject on the basis of a parallax even in a so-called monocular camera. Specifically, the subject is captured from different viewpoints from each other by moving the camera, and the distance to the subject is measured on the basis of the parallax between the captured images. Note that, at this time, the distance to be subject can be measured with more accuracy by recognizing a moving distance and a moving direction of the camera using various sensors. Note that the configuration of the imaging unit (for example, the monocular camera, the stereo camera, or the like) may be changed according to the distance measuring method.

Furthermore, the second imaging units 203a and 203b are held by the holding unit 291 such that eyeballs of the user are located within respective imaging ranges when the input/output device 20 is mounted on the head of the user. As a specific example, the second imaging unit 203a is held such that the user's right eye is located within the imaging range. The direction in which the line-of-sight of the right eye is directed can be recognized on the basis of an image of the eyeball of the right eye captured by the second imaging unit 203a and a positional relationship between the second imaging unit 203a and the right eye on the basis of such a configuration. Similarly, the second imaging unit 203b is held such that the user's left eye is located within the imaging range. In other words, the direction in which the line-of-sight of the left eye is directed can be recognized on the basis of an image of the eyeball of the left eye captured by the second imaging unit 203b and a positional relationship between the second imaging unit 203b and the left eye. Note that the example in FIG. 2 illustrates the configuration in which the input/output device 20 includes both the second imaging units 203a and 203b. However, only one of the second imaging units 203a and 203b may be provided.

The operation unit 207 is a configuration for receiving an operation on the input/output device 20 from the user. The operation unit 207 may be configured by, for example, an input device such as a touch panel or a button. The operation unit 207 is held at a predetermined position of the input/output device 20 by the holding unit 291. For example, in the example illustrated in FIG. 2, the operation unit 207 is held at a position corresponding to a temple of the glasses.

Furthermore, the input/output device 20 according to the present embodiment may be provided with, for example, an acceleration sensor and an angular velocity sensor (gyro sensor) and may be able to detect movement of the head of the user wearing the input/output device 20 (in other words, movement of the input/output device 20 itself). As a specific example, the input/output device 20 may recognize a change in at least either the position or orientation of the head of the user by detecting components in a yaw direction, a pitch direction, and a roll direction as the movement of the head of the user.

The input/output device 20 according to the present embodiment can recognize changes in its own position and orientation in the real space according to the movement of the head of the user on the basis of the above configuration. Furthermore, at this time, the input/output device 20 can present the virtual content (in other words, the virtual object) to the output unit 211 to superimpose the virtual content on the real object located in the real space on the basis of the so-called AR technology. Note that an example of a method for the input/output device 20 to estimate its own position and orientation in the real space (that is, self-position estimation) will be described below in detail.

Note that examples of a head-mounted display (HMD) device applicable as the input/output device 20 include a see-through HMD, a video see-through HMD, and a retinal projection HMD.

The see-through HMD holds a virtual image optical system (that is, a display unit having optical transparency) including a transparent light guide and the like in front of the eyes of the user, using, for example, a half mirror or a transparent light guide plate, and displays an image inside the virtual image optical system. Therefore, the user wearing the see-through HMD can take the external scenery into view while viewing the image displayed inside the virtual image optical system. With such a configuration, the see-through HMD can superimpose an image of the virtual object on an optical image of the real object located in the real space according to the recognition result of at least one of the position or orientation of the see-through HMD on the basis of the AR technology, for example. Note that a specific example of the see-through HMD includes a so-called glasses-type wearable device in which a portion corresponding to a lens of glasses is configured as a virtual image optical system. For example, the input/output device 20 illustrated in FIG. 2 corresponds to an example of the see-through HMD.

In a case where the video see-through HMD is mounted on the head or face of the user, the video see-through HMD is mounted to cover the eyes of the user, and a display unit such as a display is held in front of the eyes of the user. Furthermore, the video see-through HMD includes an imaging unit for capturing surrounding scenery, and causes the display unit to display an image of the scenery in front of the user captured by the imaging unit. With such a configuration, the user wearing the video see-through HMD has a difficulty in directly taking the external scenery into view but the user can confirm the external scenery with the image displayed on the display unit. Furthermore, at this time, the video see-through HMD may superimpose the virtual object on an image of the external scenery according to the recognition result of at least one of the position or orientation of the video see-through HMD on the basis of the AR technology, for example.

The retinal projection HMD has a projection unit held in front of the eyes of the user, and an image is projected from the projection unit toward the eyes of the user such that the image is superimposed on the external scenery. More specifically, in the retinal projection HMD, an image is directly projected from the projection unit onto the retinas of the eyes of the user, and the image is imaged on the retinas. With such a configuration, the user can view a clearer image even in a case where the user has myopia or hyperopia. Furthermore, the user wearing the retinal projection HMD can take the external scenery into view even while viewing the image projected from the projection unit. With such a configuration, the retinal projection HMD can superimpose an image of the virtual object on an optical image of the real object located in the real space according to the recognition result of at least one of the position or orientation of the retinal projection HMD on the basis of the AR technology, for example.

Furthermore, an HMD called immersive HMD can also be mentioned in addition to the above-described examples. The immersive HMD is mounted to cover the eyes of the user, and a display unit such as a display is held in front of the eyes of the user, similarly to the video see-through HMD. Therefore, the user wearing the immersive HMD has a difficulty in directly taking an external scenery (in other words, scenery of a real world) into view, and only an image displayed on the display unit comes into view. With such a configuration, the immersive HMD can provide an immersive feeling to the user who is viewing the image. Therefore, the immersive HMD can be applied in a case of presenting information mainly based on a virtual reality (VR) technology, for example.

An example of the schematic configuration of the input/output device according to the embodiment of the present disclosure has been described with reference to FIG. 2.

<1.3. Principle of Self-Position Estimation>

Next, an example of a principle of a technique for the input/output device 20 to estimate its own position and orientation in the real space (that is, self-position estimation) when superimposing the virtual object on the real object will be described.

As a specific example of the self-position estimation, the input/output device 20 captures an image of a marker or the like having a known size presented on the real object in the real space, using an imaging unit such as a camera provided in the input/output device 20. Then, the input/output device 20 estimates at least one of its own relative position or orientation with respect to the marker (and thus the real object on which the marker is presented) by analyzing the captured image. Note that the following description will be given focusing on the case where the input/output device 20 estimates its own position and orientation. However, the input/output device 20 may estimate only one of its own position or orientation.

Specifically, a relative direction of the imaging unit with respect to the marker (and thus the input/output device 20 provided with the imaging unit) can be estimated according to the direction of the marker (for example, the direction of a pattern and the like of the marker) captured in the image. Furthermore, in the case where the size of the marker is known, the distance between the marker and the imaging unit (that is, the input/output device 20 provided with the imaging unit) can be estimated according to the size of the marker in the image. More specifically, when the marker is captured from a farther distance, the marker is captured smaller. Furthermore, a range in the real space captured in the image at this time can be estimated on the basis of an angle of view of the imaging unit. By using the above characteristics, the distance between the marker and the imaging unit can be calculated backward according to the size of the marker captured in the image (in other words, a ratio occupied by the marker in the angle of view). With the above configuration, the input/output device 20 can estimate its own relative position and orientation with respect to the marker.

Furthermore, a technology so-called simultaneous localization and mapping (SLAM) may be used for the self-position estimation of the input/output device 20. SLAM is a technology for performing self-position estimation and creation of an environmental map in parallel by using an imaging unit such as a camera, various sensors, an encoder, and the like. As a more specific example, in SLAM (in particular, Visual SLAM), a three-dimensional shape of a captured scene (or subject) is sequentially restored on the basis of a moving image captured by the imaging unit. Then, by associating a restoration result of the captured scene with a detection result of the position and orientation of the imaging unit, creation of a map of a surrounding environment and estimation of the position and orientation of the imaging unit (and thus the input/output device 20) in the environment are performed. Note that the position and orientation of the imaging unit can be estimated as information indicating relative change on the basis of detection results of various sensors by providing the various sensors such as an acceleration sensor and an angular velocity sensor to the input/output device 20, for example. Of course, the estimation method is not necessarily limited to the method based on the detection results of the various sensors such as an acceleration sensor and an angular velocity sensor as long as the position and orientation of the imaging unit can be estimated.

Under the above configuration, the estimation result of the relative position and orientation of the input/output device 20 with respect to the known marker, which is based on the imaging result of the marker by the imaging unit, may be used for initialization processing or position correction in SLAM described above, for example. With the configuration, the input/output device 20 can estimate its own position and orientation with respect to the marker (and thus the real object on which the marker is presented) by the self-position estimation based on SLAM reflecting results of the initialization and position correction executed before even in a situation where the marker is not included in the angle of view of the imaging unit.

Furthermore, the above description has been made focusing on the example of the case of performing the self-position estimation mainly on the basis of the imaging result of the marker. However, a detection result of another target other than the marker may be used for the self-position estimation as long as the detection result can be used as a reference for the self-position estimation. As a specific example, a detection result of a characteristic portion of an object (real object) in the real space, such as a shape or pattern of the object, instead of the marker, may be used for the initialization processing or position correction in SLAM.

An example of the principle of the technique for the input/output device 20 to estimate its own position and orientation in the real space (that is, self-position estimation) when superimposing the virtual object on the real object has been described. Note that the following description will be given on the assumption that the position and orientation of the input/output device 20 with respect to an object (real object) in the real space can be estimated on the basis of the above-described principle, for example.

2. EXAMINATION OF DISPLAY CONTROL ACCORDING TO CHANGE IN BRIGHTNESS OF SURROUNDING ENVIRONMENT

Next, an outline of display control according to a change in brightness in a surrounding environment under a situation where the brightness of the surrounding environment may affect presentation of information such as a case of using the so-called transmission-type display will be described, and then technical problems of the information processing system according to the embodiment of the present disclosure will be described. Note that, in the present disclosure, description of "display information" refers to information such as an image (for example, a still image or a moving image) or character information visually presented to the user via the output unit such as a display unless otherwise specified.

Under the situation where information is presented using the output unit such as a display, the brightness (illuminance) of the surrounding environment may affect the visibility of the presented display information. As a specific example, the illuminance greatly differs between the case where the illuminance of the surrounding environment is relatively low such as indoors and the case where the illuminance of the surrounding environment is relatively high such as outdoors (for example, 100 to tens of thousands lx). Under conditions where the illuminance of the surrounding environment can change, as described above, even if the display information is presented with the same brightness, the visibility of the presented display information is lower when the illuminance is relatively high such as outdoors than when the illuminance is relatively low such as indoors, resulting in having a difficulty in visual recognition. The influence of such a difference in the brightness of the surrounding environment tends to become more apparent in a case where, for example, the transmission-type display is used.

From such a background, there are some cases where the visibility of the display information (display image) presented via the output unit is improved by applying the following control according to the change in the brightness (illuminance) of the surrounding environment, for example:

control a light emission output regarding the presentation of the display information (display image) via the output unit;

control the light emission period regarding the presentation of the display information (display image) via the output unit; and control light of an external environment visible to the user.

In the method of "controlling a light emission output regarding the presentation of the display information (display image) via the output unit", the brightness of the display information visually recognized by the user is controlled by increasing luminance of a light emission body (for example, backlight) for presenting information via the output unit. Meanwhile, in the method of "controlling the light emission period regarding the presentation of the display information (display image) via the output unit", the brightness of the display information visually recognized by the user is controlled by making the light emission period of the light emission body long. Note that, in the following description, the simple description of "light emission period" refers to the light emission period regarding the presentation of the display information via the output unit (for example, the light emission period of the output unit such as a display) unless otherwise specified. Furthermore, simple description of "non-emission period" refers to a non-emission period with respect to the light emission period (for example, a non-emission period of the output unit such as a display).

Furthermore, in the method of "controlling light of an external environment visible to the user", the influence of light in an external environment (hereinafter referred to as "external light") transmitted through the output unit and visually recognized by the user is adjusted by applying a polarizing element to the output unit, for example. Such light control can suppress the illuminance of the environment where the user visually recognizes the display information even under the situation where the external illuminance is high such as outdoors. Therefore, the visibility of the display information presented via the output unit can be improved.

As described above, by applying one of the above-described controls regarding the presentation of the display information or a combination of a plurality of controls, the effect of improving the visibility of the display information is expected even under the situation where the illuminance of the surrounding environment is relatively high.

Meanwhile, under the situation where the display information is presented according to the change in the position or orientation of a viewpoint, as in the case of applying the so-called AR technology described with reference to FIG. 1, there are some cases where the presentation position of the display information is perceived to deviate from an originally assumed position depending on the control of the light emission period.

Here, to facilitate the understanding of the technical problems of the information processing system according to the present disclosure, an outline of a method of controlling the brightness of the display information visually recognized by the user by controlling the light emission period, in other words, by controlling a duty ratio between the light emission period and the non-emission period, will be described.

Figure 3:
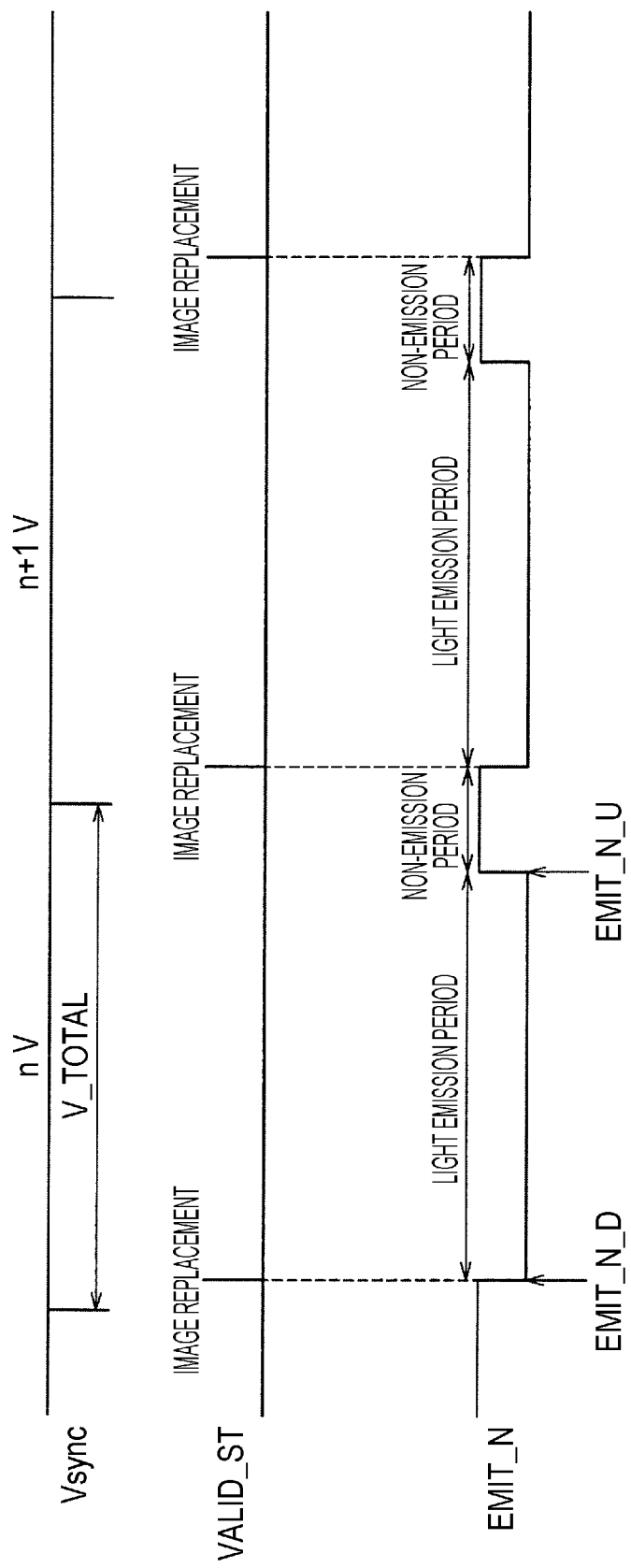
FIG. 3 is an explanatory diagram for describing an outline of a method of controlling brightness of display information visually recognized by a user by controlling a light emission period.

For example, FIG. 3 is an explanatory diagram for describing an outline of the method of controlling the brightness of the display information visually recognized by the user by controlling the light emission period. In FIG. 3, Vsync schematically represents timing of a vertical synchronization signal of the output unit such as a display. That is, V_TOTAL represents a period of the vertical synchronization signal, in other words, corresponds to a refresh rate of the output unit such as a display.

VALID_ST schematically represents timing at which an image presented via the output unit is replaced. That is, as illustrated in FIG. 3, image replacement is performed in conjunction with the period of the vertical synchronization signal.

EMIT_N schematically represents a relationship between the light emission period and the non-emission period for presenting the display information via the output unit, in other words, represents the light emission period and the non-emission period chronologically set for each period of the vertical synchronization signal. Specifically, timing indicated by EMIT_N_D represents light emission timing, and timing indicated by EMIT_N_U represents non-emission timing. The light emission timing EMIT_N_D and the non-emission timing EMIT_N_U are set between the timings at which image replacement is performed for each period of the vertical synchronization signal. Further, in the period between the timings at which the image replacement is performed, the period from the light emission timing EMIT_N_D to the non-emission timing EMIT_N_U corresponds to the light emission period, and the other period corresponds to the non-emission period.

The length of the light emission period can be controlled according to the brightness of the image to be presented (that is, the display information) set by the immediately preceding image replacement. Note that, in the example illustrated in FIG. 3, the light emission timing EMIT_N_D is fixed immediately after image replacement timing, and the length of the light emission period is controlled by appropriately controlling the non-emission timing EMIT_N_U. Of course, the example illustrated in FIG. 3 is merely an example, and does not necessarily limit the method of controlling the light emission period. That is, it is possible to control the light emission period by controlling at least either the light emission timing EMIT_N_D or the non-emission timing EMIT_N_U.

Next, an outline of the mechanism in which the presentation position of the display information is perceived to deviate from the originally assumed position according to the control of the light emission period will be described using a case of presenting the display information to be superimposed on an object (real object) in the real space (in other words, to be located at predetermined absolute coordinates in the real space) on the basis of the so-called AR technology as an example.

Figure 4:
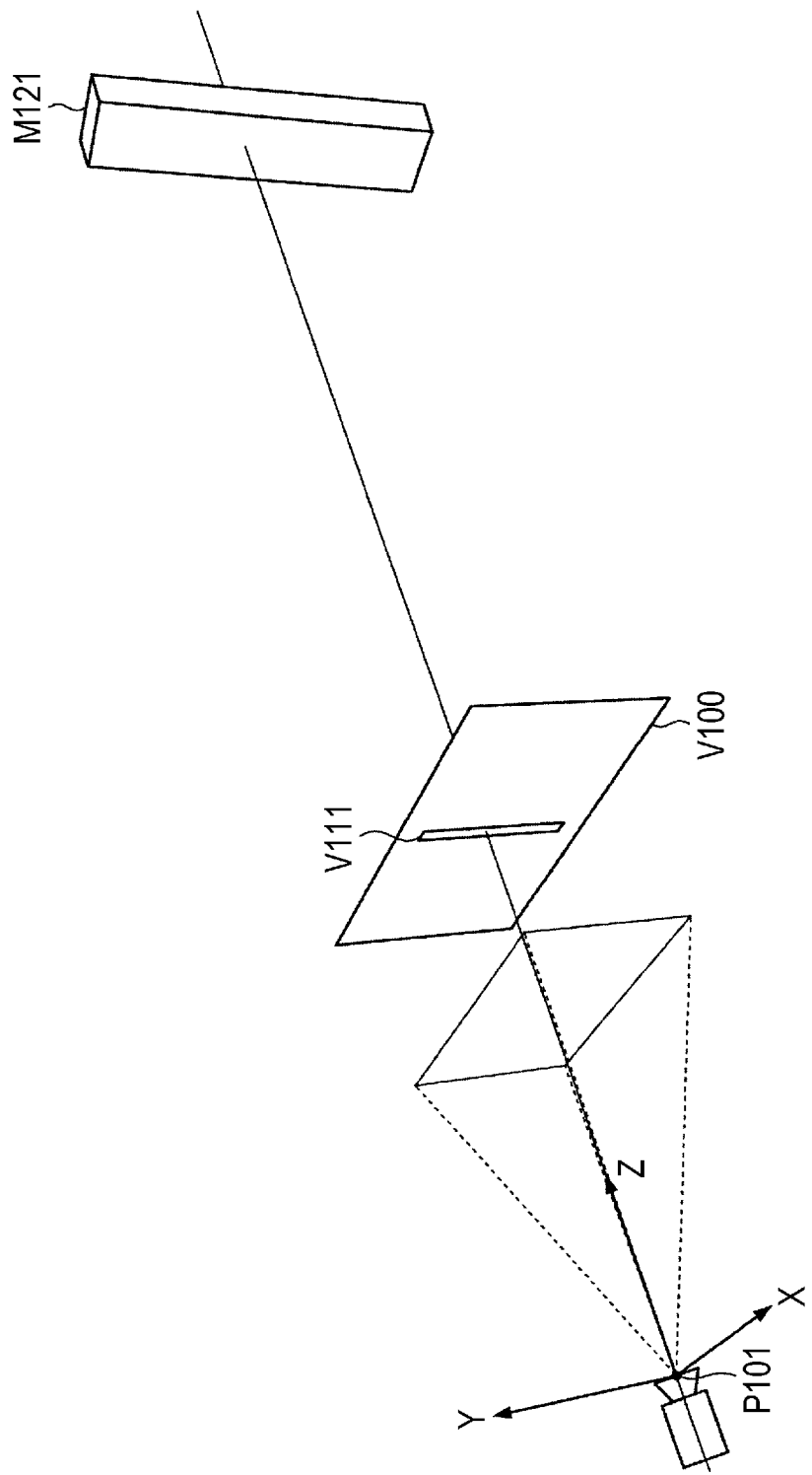
FIG. 4 is an explanatory view for describing an outline of an AR technology.

For example, FIG. 4 is an explanatory view for describing the outline of the AR technology, and schematically illustrates a mechanism for presenting the display information such that the display information is superimposed on an object in the real space. In FIG. 4, reference numeral P101 schematically represents the position and orientation of the viewpoint, and as a specific example, corresponds to the position and orientation of the input/output device 20 (more strictly, the position and orientation of the user's eyes who wears the input/output device 20). Reference numeral M121 schematically represents an object (real object) in the real space. Reference numeral V100 schematically represents a display region in which the display information is presented, and for example, can correspond to the display region of the output unit 211 of the input/output device 20. Reference numeral V111 schematically represents display information (for example, a virtual object) presented to the user via the output unit 211. Note that, in the following description, for convenience, the horizontal direction, the vertical direction, and the depth direction when viewed from the viewpoint P101 may be referred to as "X direction", "Y direction", and "Z direction", respectively.

In a case of presenting the display information V111 on the basis of the AR technology, a target object is projected on a screen surface defined according to a view (angle of view) from an observation point (view P101) as a reference, for example. That is, the screen surface corresponds to a projection surface. For example, in the case of the example illustrated in FIG. 4, an object to be presented (for example, a virtual object or the like) is projected on at least a part of the display region V100 as the screen surface (projection surface). Then, a projection result of the object is drawn as two-dimensional information, and a drawing result is presented as the display information V111 in the display region V100. At this time, the presentation position of the display information V111 in the display region V100 is controlled according to, for example, a relative position or orientation relationship between the viewpoint P101 and the real object M121. By such control, the display information V111 can be presented such that the display information V111 is superimposed on the real object M121.

Figure 5:
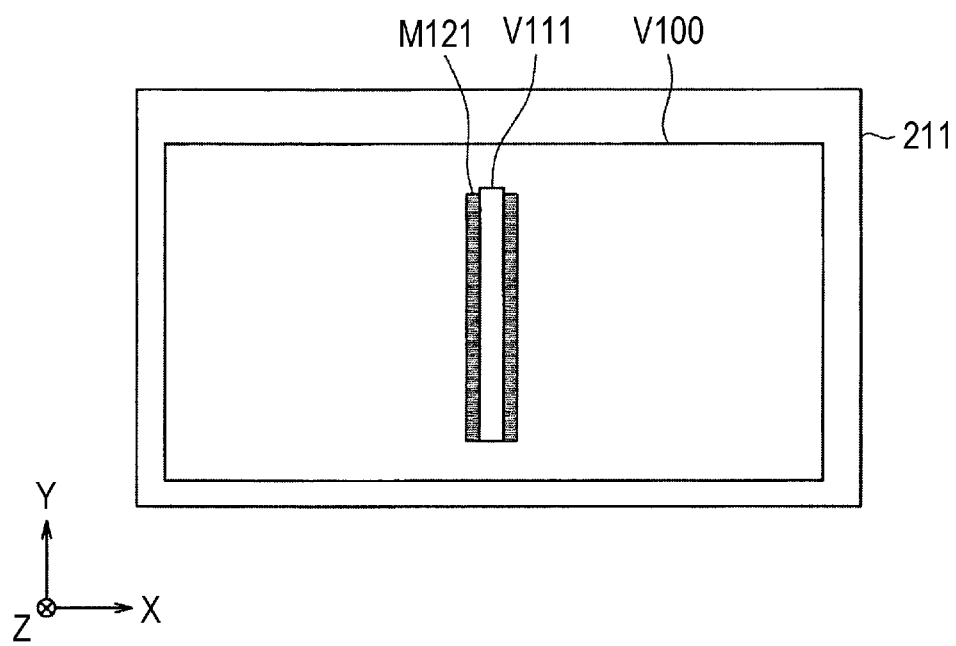
FIG. 5 is a view illustrating an example of a presentation mode for the display information based on the AR technology.

For example, FIG. 5 is a view illustrating an example of a display information presentation mode based on the AR technology, and schematically illustrates an especially ideal state among states where the display information V111 is presented to be superimposed on the real object M121 in the example illustrated in FIG. 4. Specifically, FIG. 5 schematically illustrates a combined image (that is, an optical image of the real object M121 and the display information V111) to be visually recognized by the user in the state where the display information V111 is presented in the display region V100 of the output unit 211 (that is, the transmission-type display) illustrated in FIG. 2 under the situation illustrated in FIG. 4. That is, in the example illustrated in FIG. 4, ideally, the image in which the display information V111 is superimposed on the real object M121 is visually recognized by the user, as illustrated in FIG. 5.

Meanwhile, in the case of controlling the brightness of the display information to be visually recognized by the user by controlling the length of the light emission period, as described above, there are some cases where the presentation position of the display information is perceived to deviate from the originally assumed position due to a change in the position or orientation of the viewpoint during the light emission period, for example.

Figure 6:
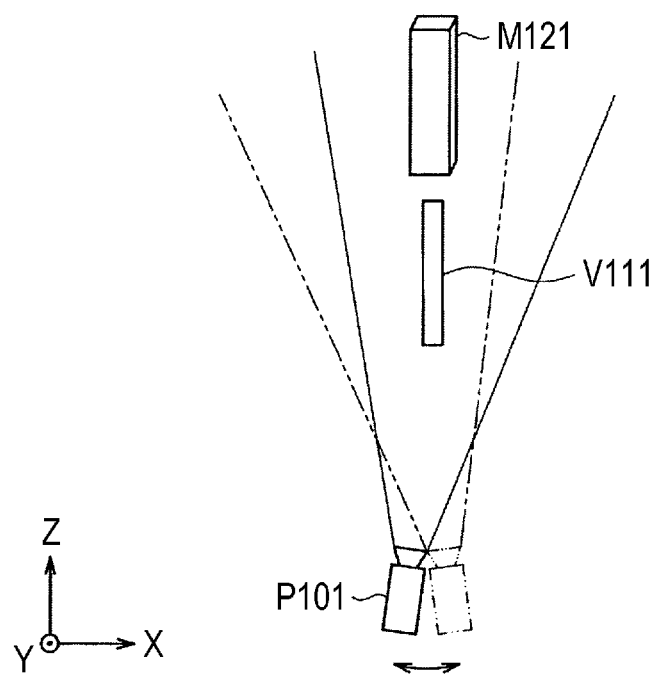
FIG. 6 is an explanatory view for describing an example of a situation in which a presentation position of the display information is perceived to deviate due to a change in position or orientation of a viewpoint during the light emission period.

For example, FIG. 6 is an explanatory view for describing an example of a situation in which the presentation position of the display information is perceived to deviate due to a change in the position or orientation of the viewpoint during the light emission period. Specifically, FIG. 6 schematically illustrates a situation in which the position or orientation of the viewpoint changes during the light emission period in the example illustrated in FIG. 4. In FIG. 6, reference numerals P101, V111, and M121 represent the objects to which the similar reference numerals are given in the example illustrated in FIG. 4. Furthermore, X, Y, and Z directions illustrated in FIG. 6 respectively correspond to the X, Y, and Z directions illustrated in FIG. 4. That is, FIG. 6 schematically illustrates a situation in which the position or orientation of the viewpoint P101 changes in the horizontal direction (X direction) during the light emission period in the example illustrated in FIG. 4.

Figure 7:
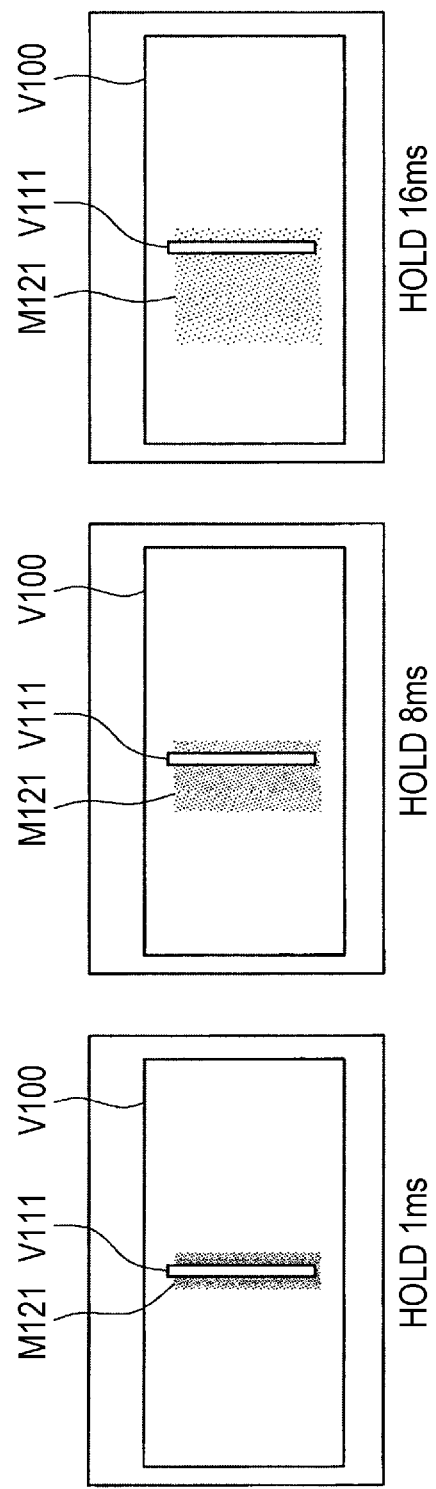
FIG. 7 is explanatory views for describing an outline of a mechanism in which the presentation position of the display information is perceived to deviate due to the change in position or orientation of a viewpoint during the light emission period.
Figure 8:
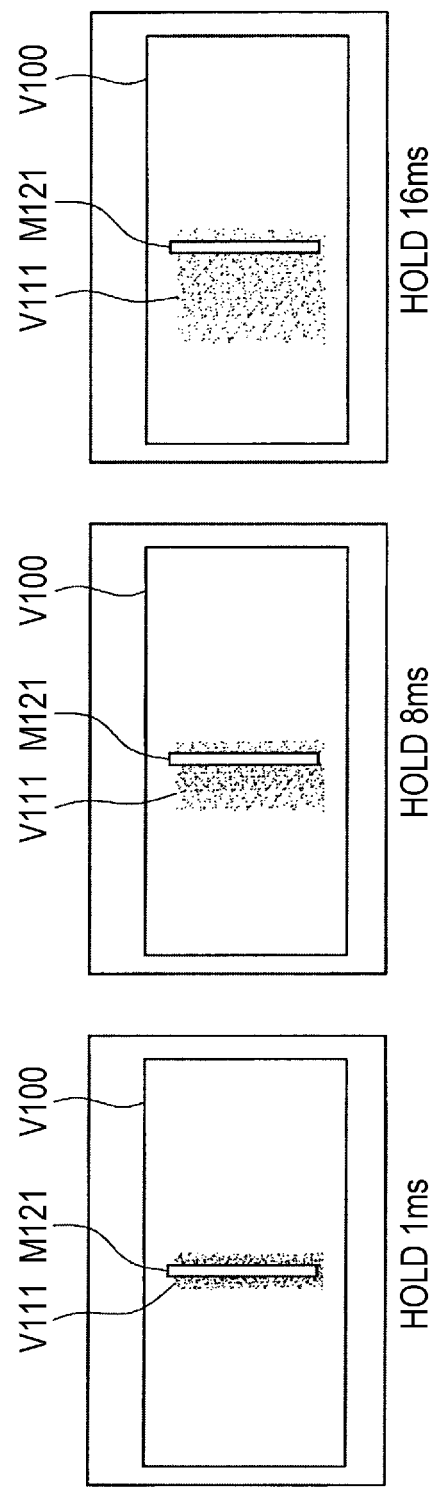
FIG. 8 is explanatory views for describing an outline of a mechanism in which the presentation position of the display information is perceived to deviate due to the change in position or orientation of a viewpoint during the light emission period.

Furthermore, FIGS. 7 and 8 are explanatory views for describing an outline of the mechanism in which the presentation position of the display information is perceived to deviate due to the change in the position or orientation of the viewpoint during the light emission period.

Specifically, FIG. 7 illustrates examples of images obtained by recapturing a combined image (that is, an optical image of the real space and the display information presented to the output unit) by the imaging unit via the output unit (for example, the output unit 211 in FIG. 2) configured as the transmission-type display under the situation illustrated in FIG. 6. Note that, in the example illustrated in FIG. 7, the imaging unit used for recapturing an image represents the user's eye, and the position or orientation integrally changes with the viewpoint P101 in the case where the position or orientation of the viewpoint P101 changes. Furthermore, the examples illustrated in FIG. 7 respectively illustrate recaptured results (in other words, the combined images visually recognized from the viewpoint P101) in a case where the light emission period (hold period) is set to "1 ms", "8 ms", and "16 ms". Furthermore, examples of the method in which the output unit such as a display presents information include a method of simultaneously rewriting the entire screen (global light emission) and a method of sequentially rewriting the screen on a line-by-line basis (scan line light emission). To make the description easier to understand, the global light emission is assumed to be applied.

Under the situation where the position or orientation of the viewpoint P101 changes during the light emission period, the relative position or orientation relationship between the imaging unit used for recapturing an image and the display information V111 is fixed, and the relative position or orientation relationship between the imaging unit and the real object M121 changes. Therefore, for example, as illustrated in FIG. 7, the recaptured results in which the real object M121 has a blur (for example, motion blur) along a direction of movement (that is, a change direction of the position or orientation of the viewpoint) are obtained with the movement of the viewpoint P101 during the light emission period. Such a blur of the real object M121 tends to become larger as the degree of change in the position or orientation of the viewpoint P101 (for example, a rate of change in the position or orientation of the viewpoint P101) is larger, and tends to become larger as the light emission period is longer, for example. Therefore, for example, in a case where the degree of change in the position or orientation of the viewpoint P101 is the same regardless of the light emission period, the blur of the real object M121 becomes larger as the light emission period becomes longer, as illustrated in FIG. 7.

Under the situation where the real object M121 has a blur, as described above, there are some cases where a center of the recaptured result of the real object M121 (that is, a center of the real object M121 with a blur) and a center of the recaptured result of the display information V111 (that is, a center of the display information V111) deviates from each other along the change direction of the position or orientation of the viewpoint P101, as illustrated in FIG. 7.

Meanwhile, FIG. 8 schematically illustrates combined images visually recognized by the user via the output unit (for example, the output unit 211 illustrated in FIG. 2) configured as the transmission-type display under the situation illustrated in FIG. 6. In FIG. 8, reference numerals V100, V111, and M121 represent the objects to which the similar reference numerals are given in the example illustrated in FIG. 7.

Specifically, under the situation where the display information V111 is presented to be superimposed on the real object M121 on the basis of the AR technology, the presentation of the display information V111 via the output unit is controlled such that an angle of convergence matches the real object M121 side, for example. More specifically, under a situation where the user visually recognizes the display information V111 using both eyes, the angle of convergence is adjusted to roughly match a distance from the viewpoint P101 to the real object M121 by adjusting the presentation positions of the display information V111 visually recognized by the left and right eyes, for example. Furthermore, at this time, a focal length may be adjusted according to the method in which the output unit presents the display information.

Under the situation where the angle of convergence is adjusted to roughly match the distance from the viewpoint P101 to the real object M121 in this way, the combined images in which a blur does not occur in the real object M121 and the display information V111 has a blur (motion blur) can be visually recognized by the user, as illustrated in FIG. 8, for example. Note that, even in this case, there are some cases where the center of the optical image of the real object M121 and the center of the display information V111 visually recognized by the user (that is, the center of the display information V111 with a blur) deviate from each other in the change direction of the position or orientation of the viewpoint P101, as illustrated in FIG. 8. Further, the amount of deviation between the center of the optical image of the real object M121 and the center of the display information V111 visually recognized by the user illustrated in FIG. 8 theoretically matches the amount of deviation between the center of the recaptured result of the real object M121 and the center of the recaptured result of the display information V111 illustrated in FIG. 7.

Under the situation where the center of the real object M121 and the center of the display information V111 deviate as illustrated in FIGS. 7 and 8, the user perceives as if the presentation position of the display information V111 has deviated. Furthermore, the deviation of the presentation position of the display information V111 perceived by the user with the change in the position or orientation of the viewpoint P101 tends to become larger as the light emission period becomes longer, as described above.

In view of the above situations, the present disclosure proposes a technology that enables presentation of the display information in a more favorable mode even under the situation where the light emission period regarding the presentation of the display information may change. Specifically, the present disclosure proposes a technology that enables suppression of appearance of the state where the deviation of the presentation position of the display information is perceived by the user even under the situation where a blur occurs in the image according to the light emission period with the change in the position or orientation of the viewpoint.

3. TECHNICAL CHARACTERISTICS

Hereinafter, technical characteristics of the information processing system 1 according to the embodiment of the present disclosure will be described.

<3.1. Basic Principle>

First, a basic principle of the technology in which the information processing system 1 according to the embodiment of the present disclosure suppresses appearance of the state where the deviation of the presentation position of the display information is perceived by the user even under the situation where a blur occurs in the image according to the light emission period with the change in the position or orientation of the viewpoint will be described. For example, FIG. 9 is explanatory views for describing the basic principle of the technical characteristics of the information processing system 1 according to the embodiment of the present disclosure.

As described with reference to FIG. 7, under the situation where a blur according to the light emission period occur in the real object M121 with the change in the position or orientation of the viewpoint, the center of the real object M121 with a blur and the center of the display information V111 deviates from each other. Therefore, the information processing system 1 according to the present embodiment estimates the deviation between the center of the real object M121 with a blur and the center of the display information V111, which occurs according to the change in the position or orientation of the viewpoint or the light emission period, and corrects the presentation position of the display information V111 to eliminate the deviation.

Figure 9:
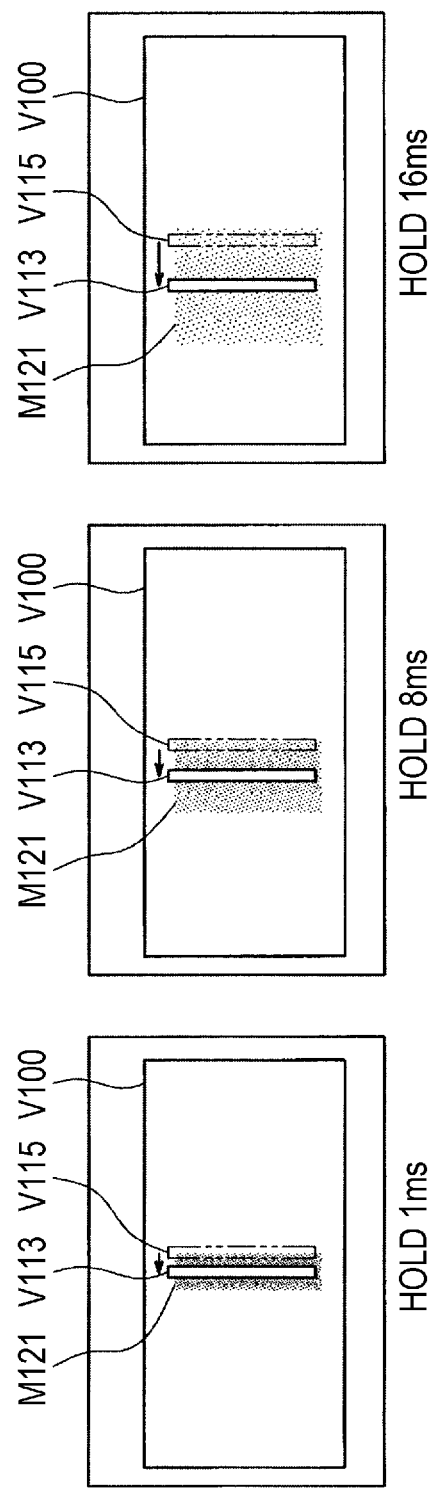
FIG. 9 is explanatory views for describing a basic principle of technical characteristics of the information processing system according to the embodiment.

For example, in FIG. 9, reference numerals V100 and M121 respectively represent the objects to which the similar reference numerals are given in the example illustrated in FIG. 7. Furthermore, reference numeral V115 schematically represents the presentation position of the display information V111 before the correction is applied. Furthermore, reference numeral V113 schematically represents the display information V111 after the presentation position is corrected. Furthermore, the examples illustrated in FIG. 9 respectively illustrate application results of the correction where the light emission period (hold period) is set to "1 ms", "8 ms", and "16 ms". Note that, in reality, the user perceives that the blur occurs on the display information V111 side as illustrated in FIG. 8 according to the change in the position or orientation of the viewpoint or the light emission period, but to make the description easier to understand, description will be given on the assumption that the blur occurs on the real object M121 side, as illustrated in FIG. 7, for convenience.

As described with reference to FIG. 7, such a blur of the real object M121 tends to become larger as the degree of change in the position or orientation of the viewpoint P101 is larger, and tends to become larger as the light emission period is longer, for example. Therefore, the information processing system 1 according to the present embodiment estimates the deviation between the center of the real object M121 with a blur and the center of the display information V111 on the basis of a detection result of the movement of the viewpoint P101 (for example, the change in the position or orientation of the viewpoint P101), and the light emission period. Then, the information processing system 1 eliminates the deviation by correcting the presentation position of the display information V111 in the display region V100 on the basis of an estimation result of the deviation.

Figure 10:
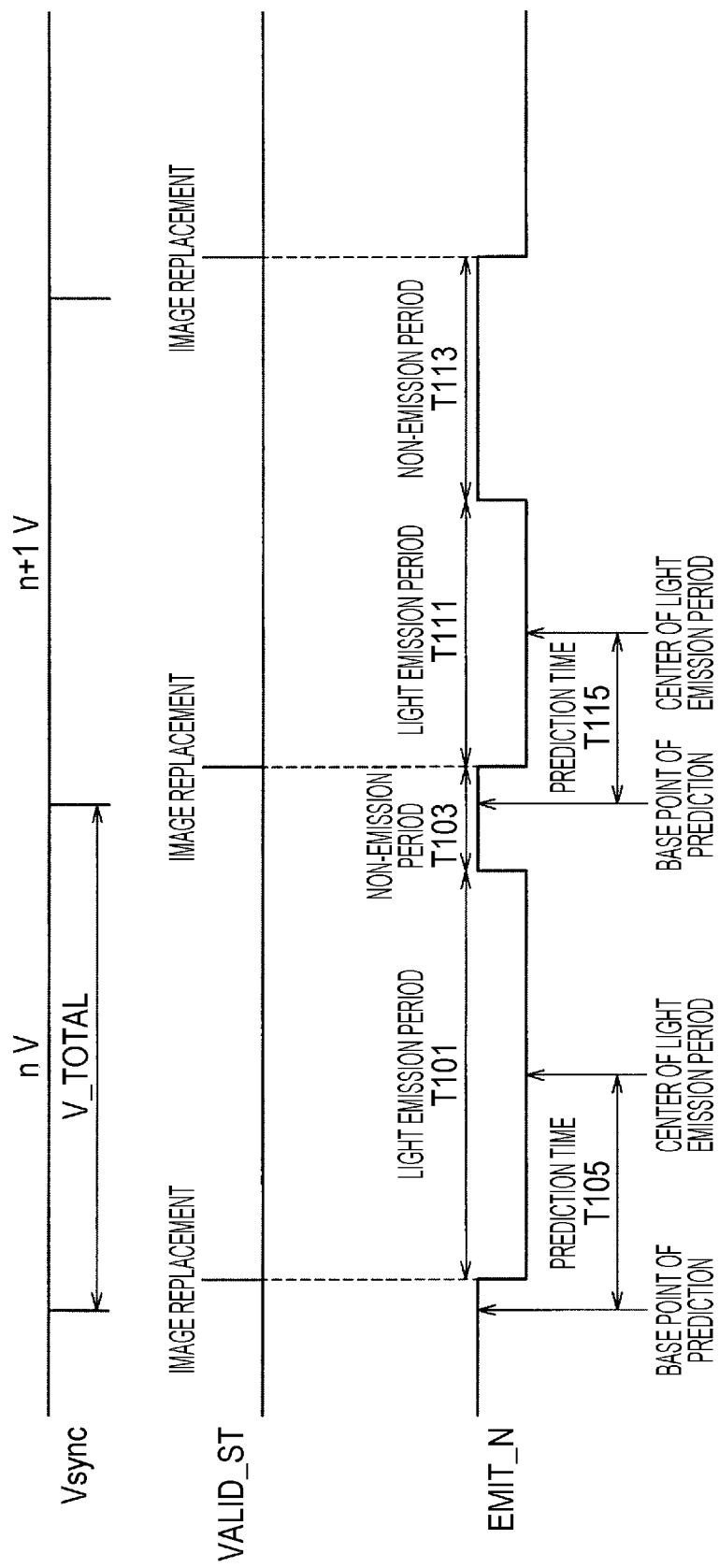
FIG. 10 is an explanatory diagram for describing a method of correcting the presentation position of the display information according to the light emission period in the information processing system according to the embodiment.

Here, the method of correcting the presentation position of the display information V111 according to the light emission period will be described in more detail with reference to FIG. 10. FIG. 10 is an explanatory diagram for describing the method of correcting the presentation position of the display information V111 according to the light emission period in the information processing system according to the embodiment of the present disclosure. In FIG. 10, Vsync, VALID_ST, and EMIT_N respectively represent the timing of the vertical synchronization signal, the timing of replacing the image presented via the output unit, and the start timings of the light emission period and the non-emission period, similarly to the example illustrated in FIG. 3.

Furthermore, in FIG. 10, reference numerals T101 and T103 represent the light emission period and the non-emission period set for an nth period (nV) of the vertical synchronization signal. Similarly, reference numerals T111 and T113 represent the light emission period and the non-emission period set for an (n+1)th period (n+1V) of the vertical synchronization signal.

When the information processing system 1 determines the light emission period according to the brightness of the external light and the brightness of the display information V111, the information processing system 1 specifies timing corresponding to the center of the light emission period on the time axis (hereinafter the timing will be simply referred to as "the center of the light emission period"). Note that the center of the light emission period corresponds to timing when the real object M121 is visually recognized to be actually located at the position corresponding to the center of the real object M121 with a blur under the situation where the real object M121 blurred with the change in the position or orientation of the viewpoint during the light emission period is visually recognized in the example illustrated in FIG. 9, for example.

Next, the information processing system 1 calculates, as a prediction time, a length of a period between timing to reach the base point for prediction set for calculating the correction amount of the presentation position of the display information V111 (that is, the base point for predicting the deviation of the presentation position of the display information perceived by the user when a blur occurs) and the specified light emission center. That is, the prediction time corresponds to a delay from the timing of the base point for prediction to when the target display information is presented in the display region and visually recognized by the user. Strictly speaking, the prediction time corresponds to a period from the timing of the base point for prediction to timing when the real object M121 is visually recognized to be actually located at the position corresponding to the center of the real object M121 visually recognized to be blurred with the change in the position or orientation of the viewpoint during the light emission period.

For example, in FIG. 10, reference numeral T105 represents the prediction time corresponding to the nth period (nV) of the vertical synchronization signal, which has been calculated on the basis of the light emission period T101. Furthermore, reference numeral T115 represents the prediction time corresponding to the (n+1)th period (n+1V) of the vertical synchronization signal, which has been calculated on the basis of the light emission period T111.

Note that the timing of the base point for prediction regarding calculation of the prediction time is simply set as timing on or before the start of the light emission period corresponding to each trigger, for each trigger of correcting the presentation position of the display information V111 (for example, each period of the vertical synchronization signal). Furthermore, the timing of the base point for prediction is only required to be set according to which delay of the flow of the series of processing regarding the presentation of the display information V111 is taken into consideration in correcting the presentation position of the display information V111. Note that details of the method of setting the timing of the base point for prediction will be described below together with description of a functional configuration of the information processing system 1.

Then, the information processing system 1 estimates the change in the relative position or orientation relationship between the viewpoint P101 and the display information V111 in the calculated prediction time, and corrects the presentation position of the display information V111 in the display region V100 according to a result of the estimation.

More specifically, the information processing system 1 estimates the change in the relative position or orientation relationship between the viewpoint P101 and the display information V111 in the prediction time according to the change in the position or orientation of the viewpoint P101 or the movement of the display information V111 itself by animation or the like, for example. Note that, hereinafter, to further simplify the description, description will be given focusing on a case where the display information V111 itself does not move, and the position or orientation of the viewpoint P101 changes, as in the example illustrated in FIG. 6, and an example of a case where the display information V111 itself moves will be described below as a modification.

The information processing system 1 calculates a direction in which a blur occurs in the image presented to the user or an amount of the blur according to the change in the position or orientation of the viewpoint P101 in the prediction time on the basis of the calculated prediction time. For example, under the situation where the position or orientation of the viewpoint P101 changes in the X direction as illustrated in FIG. 6, the blur of the image (or the optical image) (the blur of the real object M121 illustrated in FIGS. 7 and 9, for example) occurs along the X direction. Furthermore, the amount of blur that occurs at this time depends on a change amount in the position or orientation of the viewpoint P101, and the prediction time (in other words, the light emission period).

As described above, the information processing system 1 calculates the deviation between the center of the real object M121 blurred with the change in the position or orientation of the viewpoint P101 and the center of the display information V111. Then, as illustrated in FIG. 9, the information processing system 1 corrects the presentation position of the display information V111 in the display region V100, thereby eliminating the deviation between the center of the real object M121 with a blur and the center of the display information V111. That is, the deviation is eliminated as the presentation position of the display information V111 is corrected along the direction in which the deviation has occurred in the display region V100. As a more specific example, in the case of the example illustrated in FIG. 9, the presentation position of the display information V111 is presented to move toward one direction as viewed from the user who wears the input/output device 20 according to the change in the position or orientation of the viewpoint P101. Note that, in the present disclosure, the above-described "one direction" has a vector property having a specific direction. As a more specific example, in the case of the example illustrated in FIG. 9, the presentation position of the display information V111 is presented to move toward the left direction as viewed from the user who wears the input/output device 20 as the position or orientation of the viewpoint P101 moves toward the right direction. At this time, the direction (left direction) in which the presentation position of the display information V111 moves corresponds to an example of the above-described "one direction". Furthermore, at this time, the correction amount of the presentation position of the display information V111 becomes larger in the above-described one direction as the light emission period becomes longer. That is, the presentation position of the display information V111 is corrected such that the presentation position of the display information V111 is further located toward the above-described one direction (for example, toward the left direction in the case of the example illustrated in FIG. 9) as the light emission period becomes longer. Note that, at this time, the direction in which the presentation position of the display information V111 is corrected is only required to be estimated according to the direction in which the blur (motion blur) occurs with the change in the position or orientation of the viewpoint (that is, the direction in which the blur is visually recognized), for example. Furthermore, the amount of deviation calculated according to the change in the position or orientation of the viewpoint P101 in the prediction time corresponds to the correction amount of the presentation position of the display information V111.

The basic principle of the technology in which the information processing system 1 according to the embodiment of the present disclosure suppresses appearance of the state where the deviation of the presentation position of the display information is perceived by the user even under the situation where a blur occurs in the image according to the light emission period with the change in the position or orientation of the viewpoint has been described with reference to FIGS. 9 and 10.

<3.2. Functional Configuration>

Figure 11:
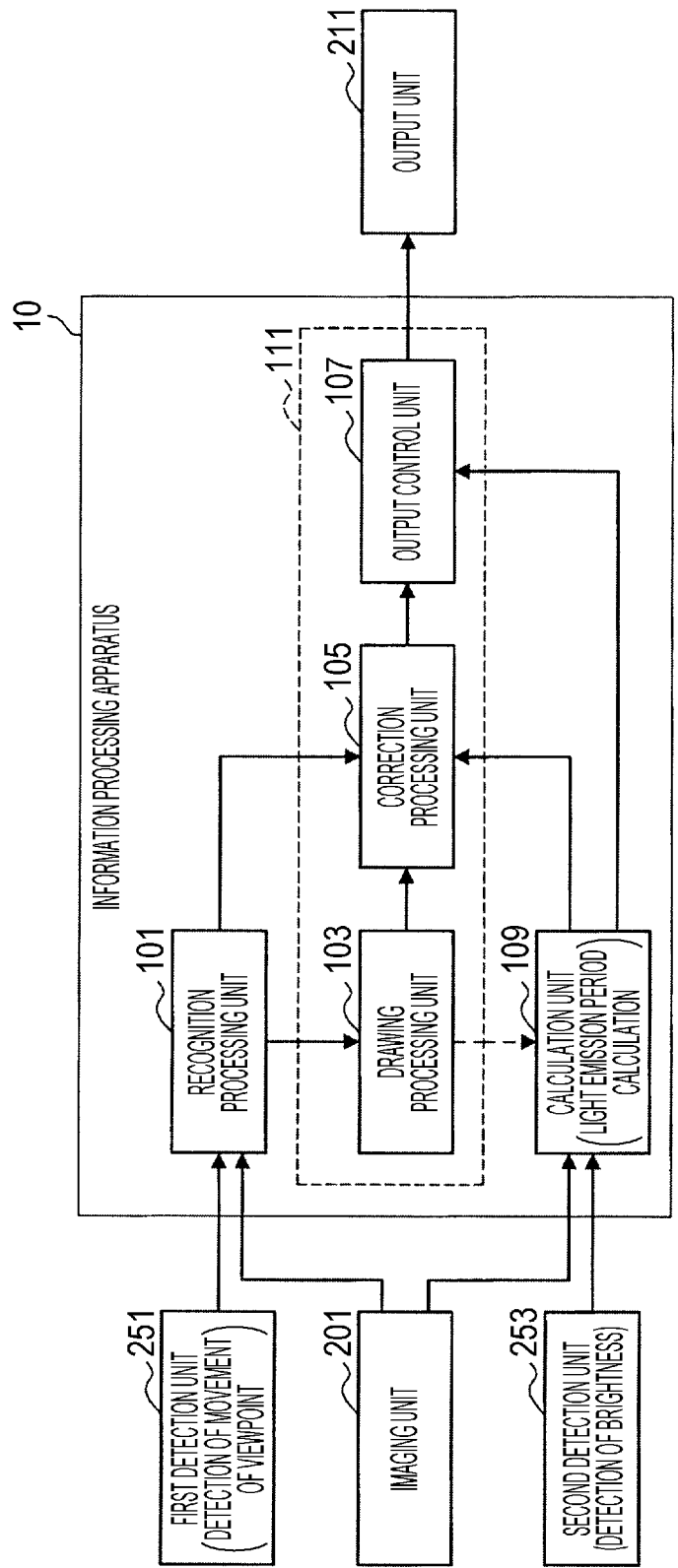
FIG. 11 is a block diagram illustrating an example of a functional configuration of the information processing system according to the embodiment.

Next, an example of a functional configuration of the information processing system 1 according to the embodiment of the present disclosure will be described. For example, FIG. 11 is a block diagram illustrating an example of a functional configuration of the information processing system 1 according to the present embodiment. Specifically, FIG. 11 illustrates an example of a functional configuration of the information processing system 1 illustrated in FIG. 1, in particular, focusing on the configuration in which the information processing apparatus 10 presents information to the user via the output unit 211 of the input/output device 20 according to the change in the position or orientation of the input/output device 20.

As illustrated in FIG. 11, the information processing system 1 according to the present embodiment includes an imaging unit 201, an output unit 211, a first detection unit 251, and a second detection unit 253, and the information processing apparatus 10. Note that the output unit 211 corresponds to, for example, the output unit 211 described with reference to FIG. 2.

The imaging unit 201 corresponds to the first imaging units 201a and 201b configured as the stereo camera in FIG. 2. The imaging unit 201 captures an image of an object (subject) in the real space and outputs the captured image to the information processing apparatus 10.

The first detection unit 251 schematically illustrates a portion regarding acquisition of information for detecting a change in the position or orientation of the input/output device 20 (and thus the movement of the head of the user wearing the input/output device 20). In other words, the first detection unit 251 acquires information for detecting the change in the position or orientation of the viewpoint (in other words, the change in the position or orientation of the input/output device 20). As a specific example, the first detection unit 251 may include various sensors related to detection of movement of an object, such as an acceleration sensor and an angular velocity sensor. The first detection unit 251 outputs the acquired information to the information processing apparatus 10. Thereby, the information processing apparatus 10 can recognize the change in the position or orientation of the input/output device 20.

The second detection unit 253 schematically illustrates a portion regarding acquisition of information regarding a state of an environment around the input/output device 20 (in other words, a state of an environment around the user who wears the input/output device 20). As a specific example, the second detection unit 253 may acquire information regarding the brightness (illuminance) of the environment around the input/output device 20. In this case, for example, the second detection unit 253 may include various sensors related to the detection of the brightness of the surrounding environment, such as an illuminance sensor. The second detection unit 253 outputs the acquired information to the information processing apparatus 10. As a result, the information processing apparatus 10 can recognize the state of the environment around the input/output device 20 (for example, the brightness of the environment around the input/output device 20). Note that, in the following description, the second detection unit 253 is assumed to acquire at least the information regarding the brightness around the input/output device 20 (for example, a detection result of the illuminance of external light) as the information regarding the state of the environment around the input/output device 20.

Next, the configuration of the information processing apparatus 10 will be described. As illustrated in FIG. 11, the information processing apparatus 10 includes a recognition processing unit 101, a drawing processing unit 103, a correction processing unit 105, an output control unit 107, and a calculation unit 109.

The recognition processing unit 101 acquires the image captured by the imaging unit 201, and applies analysis processing to the acquired image, thereby recognizing the object (subject) in the real space captured in the image. As a specific example, the recognition processing unit 101 acquires images captured from a plurality of different viewpoints (hereinafter also referred to as "stereo images") from the imaging unit 201 configured as a stereo camera, and measures the distance to the object captured in the image for each pixel of the image on the basis of the parallax between the acquired images. Thereby, the recognition processing unit 101 can estimate or recognize the relative positional relationship in the real space (in particular, the positional relationship in the depth direction) between the imaging unit 201 (and thus the input/output device 20) and each object captured in the image at the timing when the image is captured. The above is merely an example, and the method and the configuration therefor are not particularly limited as long as an object in the real space can be recognized. That is, the configuration of the imaging unit 201 and the like may be changed as appropriate according to the method of recognizing an object in the real space.

Furthermore, the recognition processing unit 101 may recognize the position or orientation of the viewpoint on the basis of the technology of self-position estimation, for example. As a specific example, the recognition processing unit 101 may perform self-position estimation and environment map creation on the basis of SLAM, thereby recognizing the positional relationship between the input/output device 20 (in other words, the viewpoint) and the object captured in the image in the real space. In this case, the recognition processing unit 101 may acquire information regarding the detection result of the change in the position and orientation of the input/output device 20 from the first detection unit 251, and use the acquired information for the self-position estimation based on SLAM, for example. Note that the above is merely an example, and the method and the configuration therefor are not particularly limited as long as the position or orientation of the viewpoint can be recognized. That is, the configuration of the imaging unit 201, the first detection unit 251, or the like may be changed as appropriate according to the method of recognizing the position or orientation of the viewpoint.

Then, the recognition processing unit 101 outputs information regarding the result of the self-position estimation of the input/output device 20 (that is, the recognition result of the position or orientation of the viewpoint) to the drawing processing unit 103 and the correction processing unit 105 to be described below. Note that, since the information regarding the result of self-position estimation is sequentially acquired, the change in the position or orientation of the input/output device 20 (that is, the change in the position or orientation of the viewpoint) can be recognized, for example. That is, the information regarding the result of self-position estimation, that is, the information regarding the recognition result of at least one of the position or orientation of the viewpoint corresponds to an example of "first information".

Furthermore, the recognition processing unit 101 may recognize the position in the real space of each object (that is, the real object) captured in the image, and output information regarding the recognition result to the drawing processing unit 103 and the correction processing unit 105. As a specific example, the recognition processing unit 101 may output information (that is, depth map) indicating the depth (the distance to the object) measured for each pixel in the image to the drawing processing unit 103 and the correction processing unit 105. Thereby, the drawing processing unit 103 or the correction processing unit 105 can recognize the object in the real space on the basis of the information.

Note that the method of measuring the distance to the subject is not limited to the above-described measuring method based on a stereo image. Therefore, the configuration corresponding to the imaging unit 201 may be appropriately changed according to the distance measuring method. As a specific example, in the case of measuring the distance to the subject based on TOF, a light source for projecting an infrared light and a light-receiving element for detecting the infrared light projected from the light source and reflected at the subject may be provided instead of the imaging unit 201. Furthermore, when measuring the distance to the object, a plurality of measuring methods may be used. In this case, a configuration for acquiring information to be used for the measurement may be provided in the input/output device 20 or the information processing apparatus 10 according to the measuring method to be used. Of course, it goes without saying that the content of the information (for example, the depth map) indicating the recognition result of the position in the real space of each object captured in the image may be appropriately changed according to the applied measuring method.

As described above, the recognition processing unit 101 sequentially recognizes the position or orientation of the viewpoint, and outputs the information regarding the recognition result of the position or orientation of the viewpoint (in other words, information regarding the movement of the viewpoint) to the drawing processing unit 103 and the correction processing unit 105 to be described below.

The drawing processing unit 103 acquires the information regarding the recognition result of the position or orientation of the viewpoint (for example, the information regarding the result of self-position estimation) from the recognition processing unit 101, and draws the display information to be presented in a predetermined buffer (for example, frame buffer) according to the position or orientation of the viewpoint based on the acquired information. At this time, the drawing processing unit 103 may project a target object (for example, a virtual object having three-dimensional information) on the display region according to the position or orientation of the viewpoint, for example, and draw the display information (that is, two-dimensional display information) according to a result of the projection in the buffer.

Furthermore, the drawing processing unit 103 may acquire information regarding a recognition result of the position of an object in the real space from the recognition processing unit 101. In this case, for example, the drawing processing unit 103 may draw the display information according to the recognition result of the object (real object) in the real space. As a specific example, the drawing processing unit 103 may project an object to be presented onto the display region according to the position or orientation relationship between the object in the real space and the object to be presented, and draw display information according to a result of the projection in the buffer.

Furthermore, the drawing processing unit 103 may control the color and brightness of the display information drawn in the buffer according to various conditions. As a specific example, when projecting a target object on the display region, the drawing processing unit 103 may control the color and brightness of the target object to be drawn as the display information according to a positional relationship between a light source defined in a three-dimensional space and the target object. Furthermore, in a case of presenting the display information to be superimposed on an object in the real space on the basis of the AR technology, the drawing processing unit 103 may control the color and brightness of the display information to be drawn according to the positional relationship between the object and the display information. Furthermore, in the case of controlling the color and brightness of the display information to be drawn as described above, the drawing processing unit 103 may output information regarding the color and brightness of the display information to the calculation unit 109 to be described below. Thereby, the calculation unit 109 can execute various calculations (for example, calculation of the light emission period) in view of the color and brightness of the display information to be presented.

The calculation unit 109 schematically represents a configuration for executing calculations of various types of information to be used by the information processing apparatus 10 to execute various types of processing. As a specific example, the calculation unit 109 calculates the light emission period when the output control unit 107, which will be described below, presents the display information to the user via the output unit 211 according to various conditions. In this case, the calculation unit 109 may acquire information regarding the brightness (illuminance) of the surrounding environment from the second detection unit 253 and calculate the light emission period on the basis of the information. Note that the portion, of the calculation unit 109, which acquires the information regarding the brightness (that is, the illuminance of the external light) of the surrounding environment from the second detection unit 253 (for example, the illuminance sensor) corresponds to an example of "illuminance information acquisition unit". Further, as another example, the calculation unit 109 may acquire the brightness of the surrounding environment by acquiring an image according to an imaging result of the surrounding environment (that is, the real space) by the imaging unit 201 and analyzing the image. Furthermore, the calculation unit 109 may acquire information regarding the color and brightness of the display information to be presented from the drawing processing unit 103 and calculate the light emission period on the basis of the information.

Furthermore, as described above, the brightness of the display information visually recognized by the user can be controlled not only by the control of the light emission period but also the control of a light emission output regarding the presentation of the display information or the control regarding adjustment of the influence of the surrounding environment (that is, control of a dimming function). Therefore, the calculation unit 109 may calculate the light emission period according to the light emission output and the control amount of the dimming function (that is, the adjustment amount of the influence of the brightness of the external light). As a more specific example, the calculation unit 109 may cause the light emission period to be shorter by causing the light emission output to be higher. Furthermore, as another example, the calculation unit 109 may cause the light emission period to be shorter by decreasing the influence of the brightness of the surrounding environment by the dimming function (that is, decreasing the external light visually recognized by the user).

Then, the calculation unit 109 outputs information according to various calculation results to each unit that uses the information. As a specific example, the calculation unit 109 outputs the information regarding the light emission period calculated as described above to the correction processing unit 105 and the output control unit 107. Note that the information regarding the light emission period is only required to include information that can be used to specify the light emission period, and can include, for example, information regarding start and end timings of the light emission period, information regarding the length of the light emission period, and the like.

The correction processing unit 105 applies various types of correction to the display information drawn in the buffer by the drawing processing unit 103. As a specific example, the correction processing unit 105 may perform correction (so-called reprojection) of the display information according to the change in the position or orientation of the viewpoint in the case where the position of orientation of the viewpoint has changed until the display information drawn in the buffer by the drawing processing unit 103 is presented to the output unit 211 by the output control unit 107 to be described below. In this case, the correction processing unit 105 may acquire the information regarding the movement of the viewpoint (for example, the information according to the recognition result of the position or orientation of the viewpoint) from the recognition processing unit 101 and correct the display information on the basis of the information. Note that the information regarding the movement of the viewpoint acquired from the recognition processing unit 101 corresponds to an example of "first information".

As a specific example, the correction processing unit 105 may calculate a direction or a change amount of a view from the viewpoint (in other words, a relative position or orientation change between the viewpoint and the object) according to the movement of the viewpoint on the basis of the information acquired from the recognition processing unit 101. As a result, the correction processing unit 105 can recognize the change in the position in the view, of the object in the real space on which the display information is superimposed (in other words, the change in the position in the display region) and can correct the presentation position of the display information according to a result of the recognition.

Furthermore, the correction processing unit 105 may correct the presentation position of the display information in the display region in view of the blur in the image caused according to the light emission period with the change in the position or orientation of the viewpoint, as described with reference to FIGS. 8 and 9.

Specifically, the correction processing unit 105 acquires the information regarding the light emission period from the calculation unit 109, and calculates the center of the light emission period on the basis of the information. Note that the information regarding the light emission period acquired from the calculation unit 109 corresponds to an example of "second information".

Then, the correction processing unit 105 calculates a period between the timing of the base point for prediction and cancellation of the calculated light emission period as the prediction time. At this time, the timing of the base point for prediction may be determined according to the position of the viewpoint or the delay considered in calculating the influence with a change.

Figure 12:
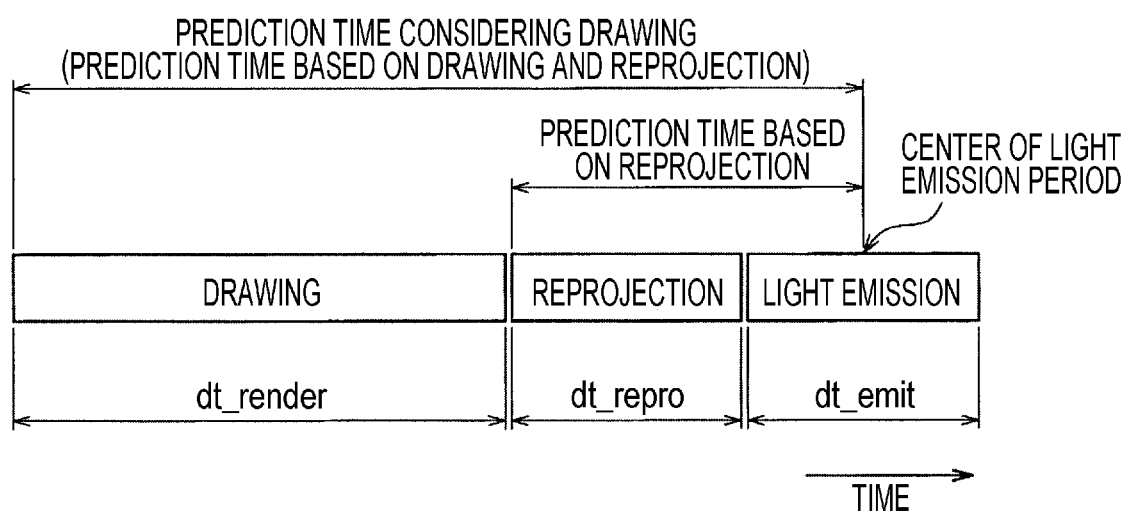
FIG. 12 is an explanatory diagram for describing an outline of processing regarding calculation of a prediction time.

For example, FIG. 12 is an explanatory diagram for describing an outline of the processing regarding calculation of the prediction time, and illustrates an example of a method for determining timing of the base point for prediction.

In FIG. 12, the period illustrated as "light emission" corresponds to each light emission period illustrated in FIG. 10, and the display information is presented in the display region of the output unit in the period. That is, in the case where a target object is presented as the display information, a projection result of the object according to the position or orientation of the viewpoint is drawn as the display information, then after correction (reprojection) is performed for the display information, the display information after correction is presented via the output unit, as illustrated in FIG. 12. Therefore, for example, a processing delay regarding correction (reprojection) for the display information executed immediately before light emission, or a processing delay regarding drawing of the display information executed before the correction may become a factor of appearance of the phenomenon in which the user perceives that the presentation position of the display information deviates. For example, in FIG. 12, the period illustrated as dt_render schematically represents the processing delay regarding drawing.

Furthermore, the period illustrated as dt_repro schematically represents the processing delay regarding reprojection. Furthermore, the period illustrated as dt_emit represents the light emission period.

From the above-described background, it is favorable to determine the timing of the base point for prediction according to which of the processing delay regarding reprojection or the processing delays regarding both the drawing and reprojection is taken into consideration when correcting the presentation position of the display information as illustrated in FIG. 9, for example.

For example, in a case where the processing delay regarding reprojection is taken into consideration and the processing delay regarding drawing is not taken into consideration, the timing of the base point for prediction is simply determined according to the start timing of the processing regarding reprojection.

Furthermore, a prediction time $T_1$ is expressed by the calculation expression described as (Equation 1) below, where the prediction time in this case is $T_1$.

[Math. 1]

$$T_1 = dt\_repro + dt\_emit/2 \quad \text{(Equation 1)}$$

Furthermore, as another example, in the case of considering the processing delays regarding both the drawing and reprojection, the timing of the base point for prediction is simply determined according to the start timing of the processing regarding drawing. Furthermore, a prediction time $T_2$ is expressed by the calculation expression described as (Equation 2) below, where the prediction time in this case is $T_2$.

[Math. 2]

$$T_2 = dt\_render + dt\_repro + dt\_emit/2 \quad \text{(Equation 2)}$$

When calculating the prediction time, as described above, the correction processing unit 105 estimates the movement of the viewpoint during the prediction time on the basis of the information regarding the movement of the viewpoint acquired from the recognition processing unit 101 and the calculation result of the prediction time. Thereby, the change in the view from the viewpoint during the prediction time (for example, the change direction or the change amount of the view) can be estimated. That is, the deviation between the center of the real object M121 blurred with the change in the position or orientation of the viewpoint P101 and the center of the display information V111 in the example illustrated in FIG. 9 can be calculated on the basis of the estimation result of the change in the view.

Then, the correction processing unit 105 corrects the presentation position of the display information in the display region on the basis of the estimation result of the movement of the viewpoint during the prediction time. Specifically, the direction of correcting the presentation position of the display information can be calculated on the basis of the direction in which the view from the viewpoint changes according to the movement of the viewpoint. Furthermore, the correction amount of the presentation position of the display information can be calculated on the basis of the change amount of the view from the viewpoint according to the movement of the viewpoint. That is, the correction amount depends on the prediction time.

When various corrections have been performed for the display information drawn in the buffer by the correction processing unit 105 as described above, the output control unit 107 causes the output unit 211 to display the corrected display information held in the buffer in time with the timing (that is, light emission timing) of displaying the information in the output unit 211. At this time, the output control unit 107 may acquire the information regarding the light emission period from the calculation unit 109 and control the light emission period of the output unit 211 regarding the presentation of the display information on the basis of the information. As a result, the brightness of the display information visually recognized by the user via the output unit 211 is controlled.

Note that, for example, the processing block (that is, the processing block including the drawing processing unit 103, the correction processing unit 105, and the output control unit 107) illustrated with reference numeral 111, in the functional configuration of the information processing system 1 illustrated in FIG. 11, corresponds to an example of "control unit" that causes the display information to be displayed in the display region of the output unit 211. Furthermore, the portion that acquires the information regarding the movement of the viewpoint from the recognition processing unit 101 and the portion that acquires the information regarding the light emission period from the calculation unit 109, of the processing block 111, correspond to an example of "acquisition unit" that acquires the information regarding the light emission period. Furthermore, the output unit 211 corresponds to an example of "display unit". Furthermore, the processing block 111 (particularly output control unit 107) corresponds to an example of "display control unit" that causes the display information (for example, the virtual object or the like) to be displayed in the output unit 211. Note that a processor that executes the processing block 111 may be regarded as corresponding to an example of the "display control unit", or may be regarded as having substantially the same configuration as the "control unit".

Furthermore, the functional configuration of the information processing system 1 illustrated in FIG. 11 is a mere example, and the functional configuration of the information processing system 1 is not necessarily limited to the example illustrated in FIG. 11 as long as the operation of the above-described configuration can be implemented. As a specific example, at least one of the imaging unit 201, the first detection unit 251, the second detection unit 253, or the output unit 211 may be integrally configured with the information processing apparatus 10. Furthermore, as another example, some functions of the information processing apparatus 10 may be provided outside the information processing apparatus 10. As a specific example, the portion corresponding to the recognition processing unit 101 and the calculation unit 109 may be provided outside the information processing apparatus 10. Note that, in this case, an interface that acquires information from the portion corresponding to the recognition processing unit 101 and the calculation unit 109 provided outside the information processing apparatus 10 can correspond to an example of the "acquisition unit" that acquires the information regarding the light emission period. Furthermore, at least some functions of the information processing apparatus 10 may be implemented by a plurality of devices operating in cooperation with one another.

An example of a functional configuration of the information processing system 1 according to the embodiment of the present disclosure has been described with reference to FIGS. 11 and 12.

<3.3. Processing>

Next, an example of a flow of the series of processing of the information processing system 1 according to the embodiment of the present disclosure will be described, in particular, focusing on the operation of the information processing apparatus 10 illustrated in FIG. 1. For example, FIG. 13 is a flowchart illustrating an example of a flow of the series of processing of the information processing system 1 according to the present embodiment, and illustrates an example of a flow of the processing in which the information processing apparatus 10 causes the display information to be presented in the display region according to the recognition result of the position or orientation of the viewpoint.

Figure 13:
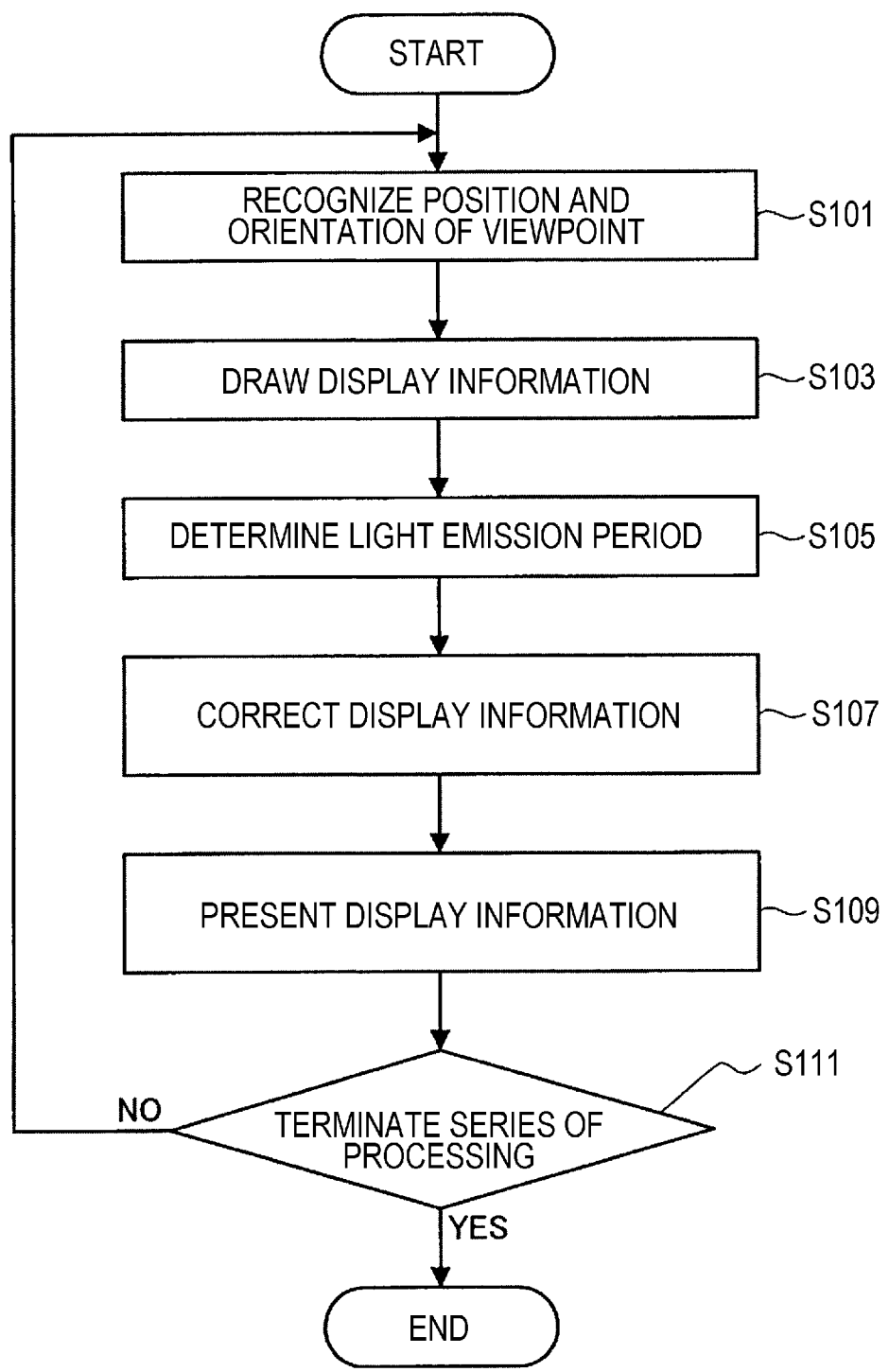
FIG. 13 is a flowchart illustrating an example of a flow of a series of processing of the information processing system according to the embodiment.

As illustrated in FIG. 13, the information processing apparatus 10 (recognition processing unit 101) recognizes at least one of the position or orientation of the viewpoint on the basis of the information regarding the imaging result of the image by the imaging unit 201 and the detection result of the change in the position or orientation of the input/output device 20 by the first detection unit 251. The self-position estimation technology such as SLAM may be used for the recognition of the position or orientation of the viewpoint, for example. As described above, the information processing apparatus 10 can recognize the movement of the viewpoint (that is, the change in the position and orientation of the viewpoint) by sequentially recognizing the position and orientation of the viewpoint (S101).

Next, the information processing apparatus 10 (drawing processing unit 103) draws the display information to be presented in a predetermined buffer according to the position or orientation of the viewpoint. As a specific example, the information processing apparatus 10 may project a target object onto the display region according to the position or orientation of the viewpoint and draw the display information according to the projection result in the buffer (S103).

Furthermore, the information processing apparatus 10 (calculation unit 109) determines the light emission period when presenting the display information to the user via the output unit 211 according to various conditions. As a specific example, the information processing apparatus 10 may calculate the light emission period according to the brightness (illuminance) of the surrounding environment. In this case, the information processing apparatus 10 may use, for example, information according to a detection result of the brightness (illuminance) of the surrounding environment by the second detection unit 253 for calculating the light emission period (S105).

Next, the information processing apparatus 10 (correction processing unit 105) estimates the movement of the viewpoint during the light emission period (for example, the change in the position or orientation of the viewpoint) on the basis of the calculation result of the light emission period, and corrects the display information drawn in the buffer according to the estimation result. Specifically, the information processing apparatus 10 calculates the center of the light emission period, and calculates the period between the timing of the base point for prediction and the center of the light emission period as the prediction time. Then, the information processing apparatus 10 recognizes the movement of the viewpoint by sequentially recognizing the position or orientation of the viewpoint, and estimates the movement of the viewpoint in the prediction time on the basis of the recognition result of the movement of the viewpoint and the calculation result of the prediction time. Then, the information processing apparatus 10 corrects the presentation position of the display information in the display region on the basis of the change in the view from the viewpoint estimated according to the movement of the viewpoint in the prediction time (S107).

Then, the information processing apparatus 10 (output control unit 107) causes the output unit 211 to display the corrected display information held in the buffer in time with the timing (that is, the light emission timing) of displaying information in the output unit 211. As a result, the display information is presented to the user via the output unit 211 (S109).

As described above, the information processing apparatus 10 sequentially executes the series of processing illustrated with reference numerals S101 to S109 at predetermined periods unless an instruction on termination of the series of processing is given (S111, NO). As a specific example, the information processing apparatus 10 may sequentially execute the series of processing illustrated with reference numerals S101 to S109 with each period of presenting information via the output unit 211, such as a period V_TOTAL of the vertical synchronization signal illustrated in FIG. 3. Then, when receiving the instruction on termination of execution of the series of processing (S111, YES), the information processing apparatus 10 terminates the execution of the series of processing illustrated with reference numerals S101 to S109.

Note that, some processing of the processing described with reference numerals S101 to S109 may be executed in parallel with another processing. As a specific example, at least some of the processing regarding drawing the display information described with reference numeral S103 may be executed in parallel with the processing regarding determination of the light emission period described with reference numeral S105.

An example of the flow of the series of processing of the information processing system 1 according to the embodiment of the present disclosure has been described with reference to FIG. 13, in particular, focusing on the operation of the information processing apparatus 10 illustrated in FIG. 1.

<3.4. Modification>

Next, modifications of the information processing system 1 according to the embodiment of the present disclosure will be described.

<3.4.1. First Modification: Application to Scan Line Light Emission>

First, as a first modification, an example of control in a case of dividing the display region of the output unit into a plurality of partial regions (for example, lines) and sequentially displaying the display information for each partial region, as in the case of applying the so-called scan line light emission, will be described.

In this case, the information processing apparatus 10 is only required to execute, for each trigger of presenting the display information for each partial region, the series of processing that has been executed for each trigger of presenting the display information via the output unit 211 (for example, each period V_TOTAL of the water-based synchronization signal) in the case of global light emission. Specifically, when presenting the display information for each partial region, the information processing apparatus 10 calculates the prediction time corresponding to the partial region on the basis of the light emission period for presenting the display information in the partial region. Then, the information processing apparatus 10 simply corrects the presentation position of the display information in the partial region on the basis of the calculation result of the prediction time. Note that the partial region can be defined to include one or more unit regions constituting the display region of the output unit, such as lines or tiles, for example.

As the first modification, an example of control in the case of dividing the display region of the output unit into the plurality of partial regions (for example, lines) and sequentially displaying the display information for each partial region, as in the case of applying the so-called scan line light emission, has been described.

<3.4.2. Second Modification: Example of Control Assuming Movement of Display Information>

Next, as a second modification, an example of control regarding presentation of the display information via the output unit under the situation where the display information itself can move such as animation will be described particularly focusing on the situation of controlling the light emission period with the movement of the display information.

Figure 14:
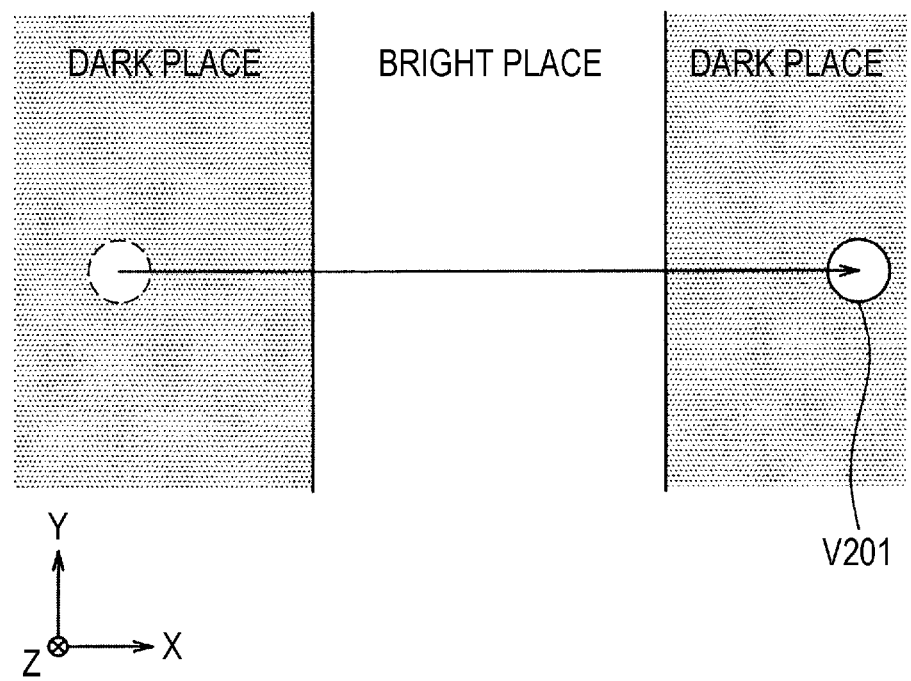
FIG. 14 is an explanatory diagram for describing an outline of processing regarding presentation of the display information by the information processing system according to a second modification.

First, an example of a situation of controlling the light emission period with the movement of the display information under the situation where the display information itself (in other words, an object presented as the display information) can move will be described with reference to FIG. 14. FIG. 14 is an explanatory diagram for describing an outline of processing regarding presentation of the display information by the information processing system according to the second modification, and schematically illustrates a situation where the brightness of the display information is controlled as the display information itself moves by animation or the like. Note that X, Y, and Z directions illustrated in FIG. 14 respectively correspond to the X, Y, and Z directions illustrated in FIG. 4. That is, FIG. 14 schematically illustrates a combined image (that is, an optical image of an object in the real space or the display information displayed in the display region) visually recognized via the output unit 211 illustrated in FIG. 2, for example.

Specifically, the example in FIG. 14 illustrates a situation in which display information V201 is presented in the display region. At this time, the display information V201 moves by animation or the like, so that the presentation position in the display region changes along the time series. More specifically, in the example illustrated in FIG. 14, the display information V201 moves such that a superimposed position changes from a dark place to a bright place with the movement, and then the superimposed position moves from the bright place to the dark place. Note that, in the present description, the "bright place" refers to a place where the illuminance is relatively high due to external light, such as outdoors. In contrast, the "dark place" refers to a place where the illuminance is relatively low because the external light is shielded by, for example, a shield or the like. In other words, the "dark place" corresponds to a place where the illuminance is relatively lower than the "bright place". Furthermore, in the present description, the position or orientation of the viewpoint (for example, the position or orientation of the input/output device 20) is fixed and does not change for making the description easier to understand.

For example, under a situation where the display information V201 is presented to be superimposed on the bright place, there are some cases where the visibility of the display information V201 presented via the output unit is lowered due to the influence of the brightness of the external light. Therefore, in such a case, the visibility of the display information V201 may be improved by causing the display information V201 to be presented brighter. That is, in this case, for example, the light emission period can be caused to be longer.

In contrast, under a situation where the display information V201 is presented to be superimposed on the dark place, the visibility of the display information V201 is higher than the case where the display information is presented to be superimposed on the bright place. Therefore, in this case, the display information V201 can be visually recognized even if the brightness of the display information V201 is suppressed as compared with the case where the display information V201 is presented to be superimposed on the bright place. That is, desired visibility can be secured in the case where the display information V201 is presented to be superimposed on the dark place even if the light emission period is caused to be shorter, as compared with the case where the display information V201 is presented to be superimposed on the bright place.

Therefore, in the example illustrated in FIG. 14, the light emission period is caused to be longer when the display information V201 moves from the dark place to the bright place, and the light emission period is caused to be shorter when the display information V201 moves from the bright place to the dark place, for example. Note that, even under such a situation, because the light emission period is caused to be longer, the image (for example, the display information V201) visually recognized by the user is blurred according to the change in the presentation position of the display information V201 during the light emission period, and the presentation position of the display information V201 is perceived to deviate.

Figure 15:
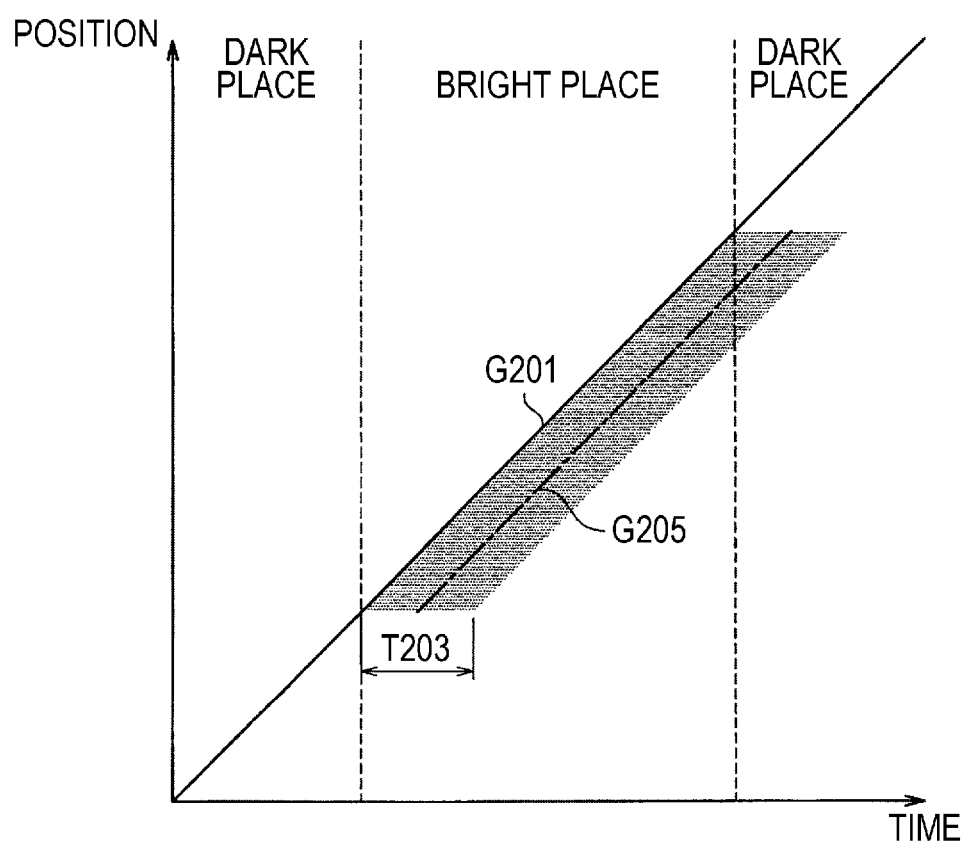
FIG. 15 is an explanatory diagram for describing an outline of processing regarding presentation of the display information by the information processing system according to the second modification.

For example, FIG. 15 is an explanatory diagram for describing an outline of processing regarding presentation of the display information by the information processing system according to the second modification, and illustrates an outline of a mechanism in which the presentation position of the display information is perceived to deviate with the control of the light emission period. Specifically, in FIG. 15, the horizontal axis represents time and the vertical axis represents the presentation position of the display information. Furthermore, in FIG. 15, reference numeral G201 schematically represents the relationship between the start timing of light emission of the output unit regarding presentation of the display information and the presentation position of the display information. That is, reference numeral G201 schematically represents a locus of the presentation position of the display information under the situation where the image visually recognized by the user is not blurred, as in the case where the display information is presented to be superimposed on the dark place.

Furthermore, the example in FIG. 15 schematically illustrates the situation where the position at which the display information is superimposed moves to change from the dark place to the bright place with time, and then, the superimposed position moves to change from the bright place to the dark place along the time axis (horizontal axis), as illustrated in FIG. 14. Therefore, in the example illustrated in FIG. 15, the light emission period is caused to be longer during the period in which the display information is superimposed on the bright place. For example, reference numeral T203 schematically represents the light emission period in the case where the display information is presented to be superimposed on the bright place.

As illustrated in FIG. 15, by causing the light emission period to be longer, the image visually recognized by the user is blurred according to the change in the presentation position of the display information, and the presentation position of the display information is perceived to deviate. For example, reference numeral G205 schematically represents a locus of the display information visually recognized by the user in the bright place. Specifically, as in the above-described embodiment, the user perceives that the display information is presented at the position corresponding to the center of the light emission period.

As can be seen by comparing the locus G201 and the locus G205 in the case of presenting the display information to be superimposed on the dark place, in FIG. 15, there are some cases where the presentation position of the display information is perceived to deviate by causing the light emission period to be longer even under the situation where the display information itself moves.

In view of such a situation, the information processing system according to the second modification estimates the deviation between the center of the display information with a blur and the center of the real object on which the display information is superimposed, and corrects the presentation position of the display information to eliminate the deviation, according to the change in the presentation position of the display information or the light emission period.

Figure 16:
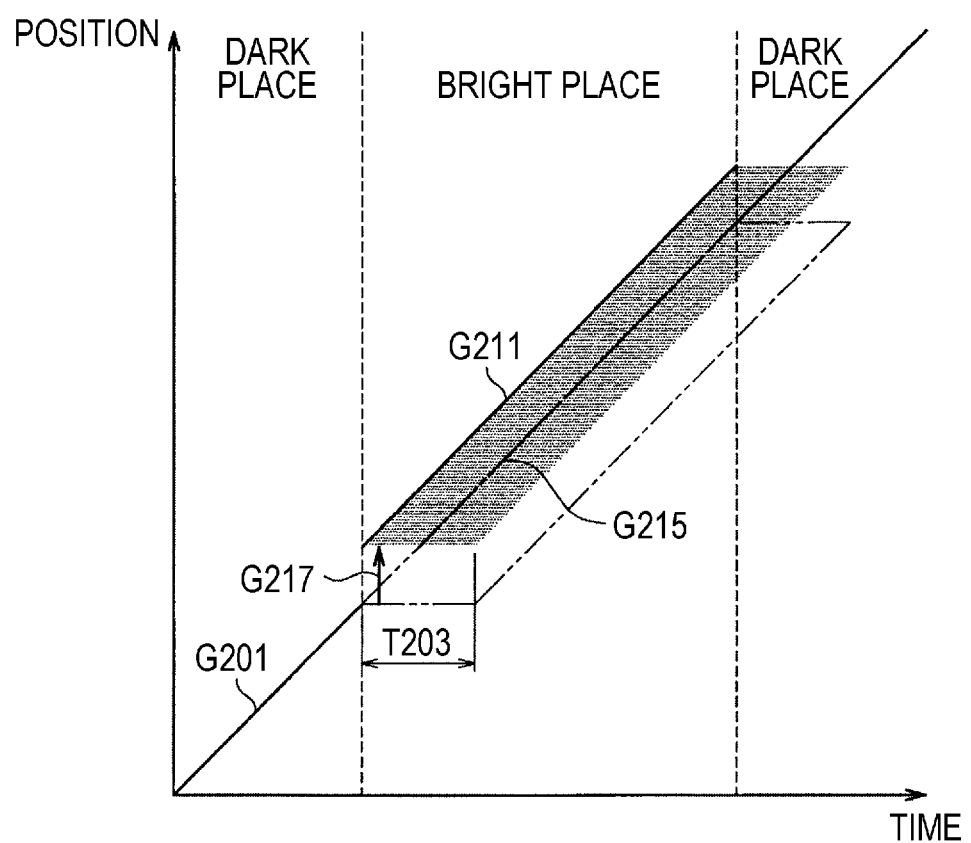
FIG. 16 is an explanatory diagram for describing an outline of processing regarding presentation of the display information by the information processing system according to the second modification.

For example, FIG. 16 is an explanatory diagram for describing an outline of processing regarding presentation of the display information by the information processing system according to the second modification, and schematically illustrates a situation where the presentation position of the display information is corrected by the information processing system. In FIG. 16, the vertical axis and the horizontal axis are similar to the vertical axis and the horizontal axis in FIG. 15. Furthermore, reference numeral G201 schematically represents the relationship between light emission timing of the output unit according to the presentation of the display information and the presentation position of the display information in the case of presenting the display information to be superimposed on the dark place. In other words, reference numeral G201 schematically represents a locus of the presentation position of the display information under the situation where the image visually recognized by the user is not blurred, as in the case where the display information is presented to be superimposed on the dark place.

Furthermore, the example in FIG. 16 schematically illustrates the situation where the position at which the display information is superimposed moves to change from the dark place to the bright place with time, and then, the superimposed position moves to change from the bright place to the dark place along the time axis (horizontal axis), similarly to the example in FIG. 15. That is, reference numeral T203 schematically represents the light emission period in the case where the display information is presented to be superimposed on the bright place, similarly to the case illustrated in FIG. 15.

Furthermore, reference numeral G211 schematically represents the relationship between light emission start timing of the output unit according to the presentation of the display information and the presentation position of the display information after the presentation position is corrected according to the light emission period T203, in the case of presenting the display information to be superimposed on the bright place. In other words, reference numeral G211 schematically represents a locus of the presentation position of the corrected display information at the light emission start timing of the output unit in the case of presenting the display information to be superimposed on the bright place.

In contrast, reference numeral G215 schematically represents a locus of the display information visually recognized by the user in the bright place after the presentation position of the display information is corrected. Furthermore, reference numeral G217 schematically illustrates correction of the presentation position applied according to the light emission period T203 (that is, the correction direction and the correction amount of the correction to be applied) in the case of presenting the display information to be superimposed on the bright place.

That is, in the example in FIG. 16, correction G217 according to the light emission period T203 and the movement of the display information is applied to the presentation position of the display information in the case of presenting the display information to be superimposed on the bright place. As a result, the locus G215 of the display information visually recognized by the user in the bright place substantially matches an extension line of the locus G201 of the display information when presented to be superimposed on the dark place. This is similar both in the case where the position on which the display information is superimposed moves to change from the dark place to the bright place, and the case where the position on which the display information is superimposed moves to change from the bright place to the dark place. Furthermore, in the second modification, the information regarding the movement of the display information (in other words, the movement of the object presented as the display information) corresponds to an example of the "first information".

With the above control, even under the situation where the display information itself moves, the presentation position of the display information is corrected according to the light emission period T203 and the movement of the display information, so that the deviation of the presentation position of the display information perceived by the user according to the light emission period T203 can be eliminated.

As described above, the information processing system according to the embodiment of the present disclosure applies the correction of the presentation position of the display information according to the relative movement (for example, the relative position or orientation change) between the viewpoint and the display information regardless of whether or not the position or orientation of the viewpoint changes, thereby eliminating the deviation of the presentation position of the display information perceived by the user. That is, even under the situation where the position or orientation of the viewpoint changes and the display information itself moves, the presentation position of the display information is corrected according to the relative movement between the viewpoint and the display information, and the light emission period regarding the presentation of the display information. Note that, in this case, the presentation position of the display information is corrected along a relative position or orientation change direction between the viewpoint and the display information. Furthermore, the correction amount of the presentation position of the display information can be calculated according to the prediction time calculated on the basis of the light emission period and the amount of relative movement between the viewpoint and the display information in the prediction time (for example, the position or orientation change amount). Furthermore, in this case, the information regarding the relative movement between the viewpoint and the display information corresponds to an example of the "first information".

As the second modification, an example of control regarding presentation of the display information via the output unit under the situation where the display information itself can move such as animation has been described with reference to FIGS. 14 to 16 particularly focusing on the situation of controlling the light emission period with the movement of the display information.

4. HARDWARE CONFIGURATION

Next, an example of a hardware configuration of the information processing apparatus 10 that configures the information processing system according to the present embodiment will be described.

<4.1. Configuration Example as Independently Operable Device>

Figure 17:
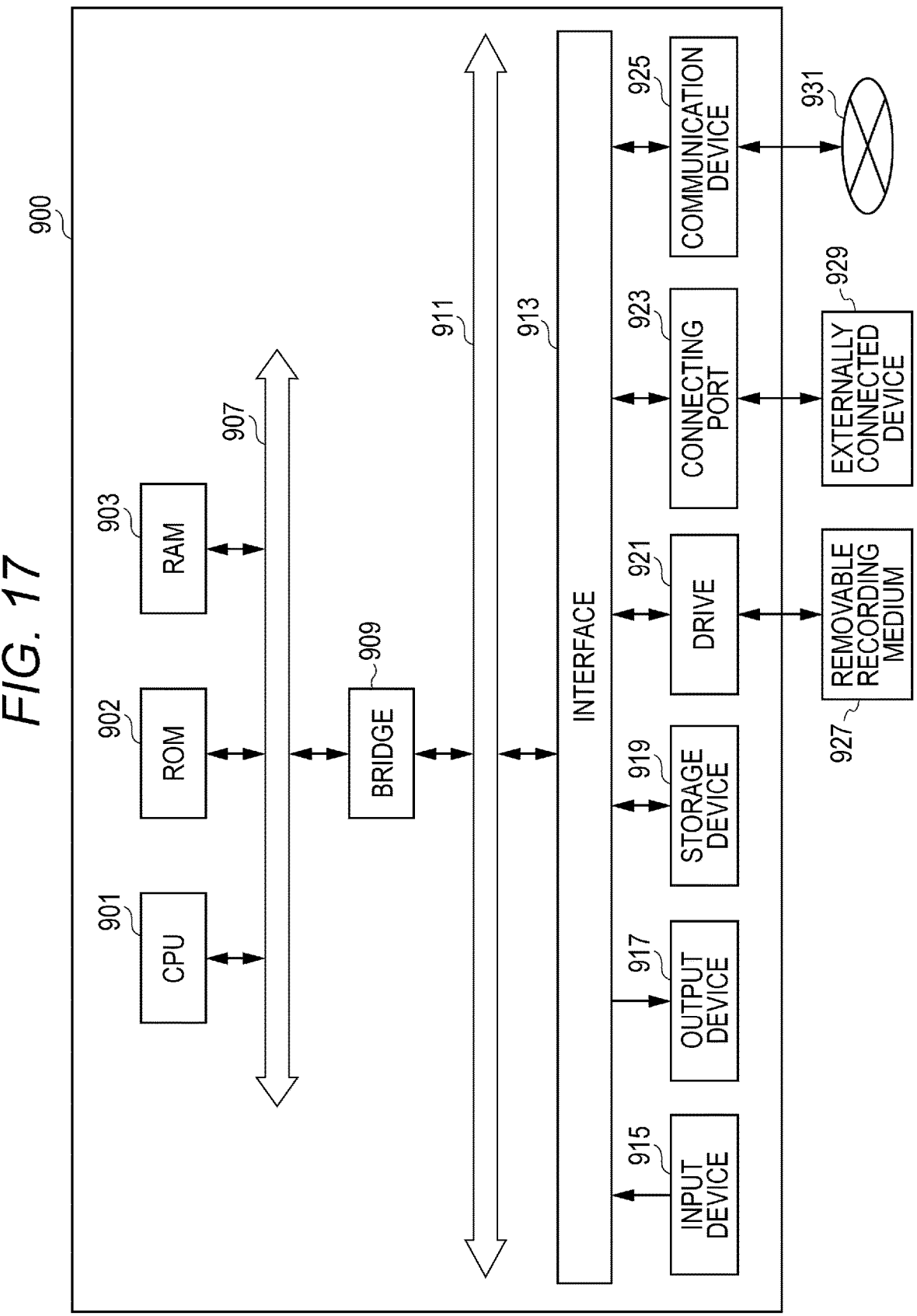
FIG. 17 is a functional block diagram illustrating an example of a hardware configuration of an information processing apparatus configuring the information processing system according to the embodiment of the present disclosure.

First, an example of a hardware configuration of an information processing apparatus 900 in a case where the configuration corresponding to the above-described information processing apparatus 10 is implemented as an independently operable device such as a PC, a smartphone, or a server (which will be referred to as the "information processing apparatus 900" for convenience) will be described in detail with reference to FIG. 17. FIG. 17 is a functional block diagram illustrating an example of a hardware configuration of the information processing apparatus 900 configuring the information processing system according to the embodiment of the present disclosure.

The information processing apparatus 900 configuring the information processing system 1 according to the present embodiment mainly includes a CPU 901, a ROM 902, and a RAM 903. Furthermore, the information processing apparatus 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control device, and controls general operation or part thereof of the information processing apparatus 900 according to various programs recorded in the ROM 902, the RAM 903, the storage device 919, or a removable recording medium 927. The ROM 902 stores programs, arithmetic operation parameters, and the like used by the CPU 901. The RAM 903 primarily stores the programs used by the CPU 901, parameters that appropriately change in execution of the programs, and the like. The CPU 901, the ROM 902, and the RAM 903 are mutually connected by the host bus 907 configured by an internal bus such as a CPU bus. Note that the recognition processing unit 101, the drawing processing unit 103, the correction processing unit 105, the output control unit 107, and the calculation unit 109 described with reference to FIG. 11 can be implemented by the CPU 901, for example.

The host bus 907 is connected to the external bus 911 such as a peripheral component interconnect/interface (PCI) bus via the bridge 909. Furthermore, the input device 915, the output device 917, the storage device 919, the drive 921, the connection port 923, and the communication device 925 are connected to the external bus 911 via the interface 913.

The input device 915 is an operation unit operated by the user, such as a mouse, a keyboard, a touch panel, a button, a switch, a lever, and a pedal, for example. Furthermore, the input device 915 may be, for example, a remote control unit (so-called remote controller) using infrared rays or other radio waves or an externally connected device 929 such as a mobile phone or a PDA corresponding to an operation of the information processing apparatus 900. Moreover, the input device 915 is configured by, for example, an input control circuit for generating an input signal on the basis of information input by the user using the above-described operation unit and outputting the input signal to the CPU 901, or the like. The user of the information processing apparatus 900 can input various data and give an instruction on processing operations to the information processing apparatus 900 by operating the input device 915.

The output device 917 is configured by a device that can visually or audibly notify the user of acquired information. Examples of such devices include display devices such as a CRT display device, a liquid crystal display device, a plasma display device, an EL display device, a lamp, and the like, sound output devices such as a speaker and a headphone, and a printer device. The output device 917 outputs, for example, results obtained by various types of processing performed by the information processing apparatus 900. Specifically, the display device displays the results of the various types of processing performed by the information processing apparatus 900 as texts or images. Meanwhile, the sound output device converts an audio signal including reproduced sound data, voice data, or the like into an analog signal and outputs the analog signal. Note that the output unit 211 described with reference to FIG. 11 can be implemented by the output device 917, for example.

The storage device 919 is a device for data storage configured as an example of a storage unit of the information processing apparatus 900. The storage device 919 is configured by a magnetic storage device such as a hard disk drive (HDD), a semiconductor storage device, an optical storage device, a magneto-optical storage device, or the like, for example. The storage device 919 stores programs executed by the CPU 901, various data, and the like.

The drive 921 is a reader/writer for a recording medium, and is built in or is externally attached to the information processing apparatus 900. The drive 921 reads out information recorded on the removable recording medium 927 such as a mounted magnetic disk, optical disk, magneto-optical disk, or semiconductor memory, and outputs the information to the RAM 903. Furthermore, the drive 921 can also write a record on the removable recording medium 927 such as the mounted magnetic disk, optical disk, magneto-optical disk, or semiconductor memory. The removable recording medium 927 is, for example, a DVD medium, an HD-DVD medium, a Blu-ray (registered trademark) medium, or the like. Furthermore, the removable recording medium 927 may be a compact flash (CF (registered trademark)), a flash memory, a secure digital (SD) memory card, or the like. Furthermore, the removable recording medium 927 may be, for example, an integrated circuit (IC) card on which a non-contact IC chip is mounted, an electronic device, or the like.

The connection port 923 is a port for being directly connected to the information processing apparatus 900. Examples of the connection port 923 include a universal serial bus (USB) port, an IEEE 1394 port, a small computer system interface (SCSI) port, and the like. Other examples of the connection port 923 include an RS-232C port, an optical audio terminal, a high-definition multimedia interface (HDMI) (registered trademark) port, and the like. By connecting the externally connected device 929 to the connection port 923, the information processing apparatus 900 directly acquires various data from the externally connected device 929 and provides various data to the externally connected device 929.

The communication device 925 is, for example, a communication interface configured by a communication device for being connected to a communication network (network) 931, and the like. The communication device 925 is, for example, a communication card for a wired or wireless local area network (LAN), Bluetooth (registered trademark), a wireless USB (WUSB), or the like. Furthermore, the communication device 925 may be a router for optical communication, a router for an asymmetric digital subscriber line (ADSL), a modem for various communications, or the like. The communication device 925 can transmit and receive signals and the like, for example, to and from the Internet and other communication devices in accordance with a predetermined protocol such as TCP/IP, for example. Furthermore, the communication network 931 connected to the communication device 925 is configured by a network or the like connected by wire or wirelessly, and may be, for example, the Internet, home LAN, infrared communication, radio wave communication, satellite communication, or the like.

An example of the hardware configuration that can implement the functions of the information processing apparatus 900 that configures the information processing system 1 according to the embodiment of the present disclosure has been described. Each of the above-described configuration elements may be configured using general-purpose members or may be configured by hardware specialized for the function of each configuration element. Therefore, the hardware configuration to be used can be changed as appropriate according to the technical level of the time of carrying out the present embodiment. Note that various configurations corresponding to the information processing apparatus 900 configuring the information processing system 1 according to the present embodiment are naturally provided although not illustrated in FIG. 17.

Note that a computer program for implementing the functions of the information processing apparatus 900 configuring the information processing system 1 according to the above-described present embodiment can be prepared and implemented on a personal computer or the like. Furthermore, a computer-readable recording medium in which such a computer program is stored can be provided. The recording medium is, for example, a magnetic disk, an optical disk, a magneto-optical disk, a flash memory, or the like. Furthermore, the above computer program may be delivered via, for example, a network without using a recording medium. Furthermore, the number of computers that execute the computer program is not particularly limited. For example, a plurality of computers (for example, a plurality of servers or the like) may execute the computer program in cooperation with one another. Note that a single computer or a plurality of computers cooperating with one another is also referred to as a "computer system".

An example of the hardware configuration of the information processing apparatus 900 in the case of implementing the configuration corresponding to the above-described information processing apparatus 10 as the independently operable information processing apparatus 900 such as a PC, a smartphone, or a server has been described in detail with reference to FIG. 17.

<4.2. Configuration Example when Implementing Information Processing Apparatus as Chip>

Figure 18:
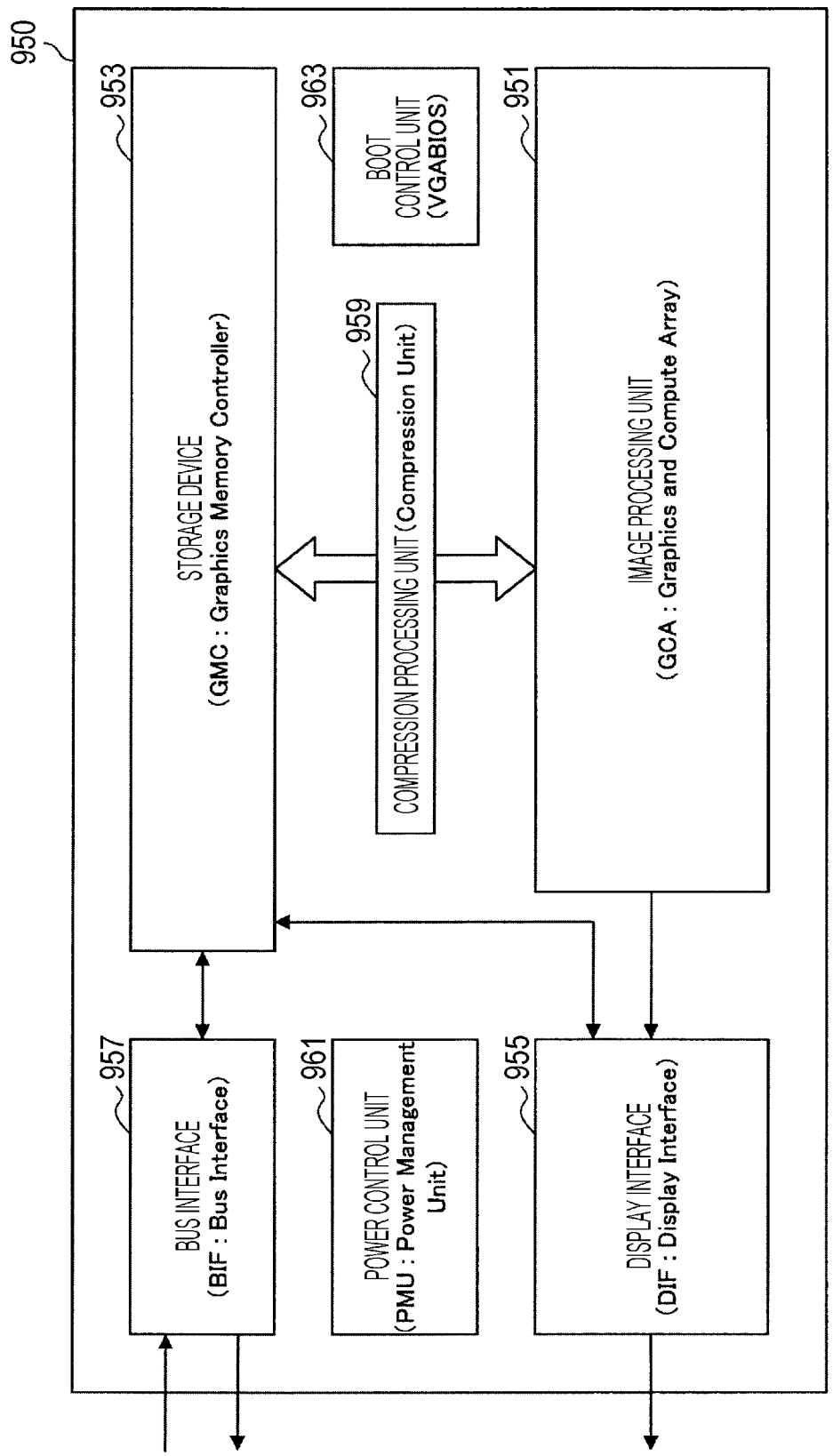
FIG. 18 is a functional block diagram illustrating an example of a hardware configuration in a case where the information processing apparatus configuring the information processing system according to the embodiment of the present disclosure is implemented as a chip.

Next, an example of a hardware configuration of a chip 950 in the case of implementing the configuration corresponding to the above-described information processing apparatus 10 as a chip such as a GPU (which will be referred to as the "chip 950" for convenience) will be described in detail with reference to FIG. 18. FIG. 18 is a functional block diagram illustrating an example of a hardware configuration in the case of implementing the information processing apparatus configuring the information processing system according to the embodiment of the present disclosure as a chip.

As illustrated in FIG. 18, the chip 950 includes an image processing unit (graphics and compute array: GCA) 951, a storage device (graphics memory controller: GMC) 953, a display interface (DIF) 955, a bus interface (BIF) 957, a power control unit (power management unit: PMU) 961, and a boot control unit (VGABIOS) 963. Furthermore, a compression processing unit (compression unit) 959 may be interposed between the image processing unit 951 and the storage device 953.

The image processing unit 951 corresponds to a processor that executes various types of processing regarding image processing. As a specific example, the image processing unit 951 executes various types of calculation processing such as the above-described processing regarding projecting an object, processing regarding drawing the display information according to the projection result, and processing regarding correcting the display information such as reprojection. Furthermore, at this time, the image processing unit 951 may read data stored in the storage device 953 and use the data for execution of the various types of arithmetic processing. Note that the processing of the recognition processing unit 101, the drawing processing unit 103, the correction processing unit 105, the output control unit 107, and the calculation unit 109, which has been described with reference to FIG. 11, can be implemented by the calculation processing by the image processing unit 951, for example.

The storage device 953 is a configuration for temporarily or permanently storing various data. As a specific example, the storage device 953 may store data according to execution results of the various types of arithmetic processing by the image processing unit 951. The storage device 953 can be implemented on the basis of a technology of video RAM (VRAM), window RAM (WRAM), multibank DRAM (MDRAM), double-data-rate (DDR), graphics DDR (GDDR), high bandwidth memory (HBM), or the like, for example.

The compression processing unit 959 compresses and decompresses various data. As a specific example, the compression processing unit 959 may compress data according to a calculation result by the image processing unit 951 when the data is stored in the storage device 953. Furthermore, when the image processing unit 951 reads data stored in the storage device 953, the compression processing unit 959 may decompress the data in the case where the data is compressed.

The display interface 955 is an interface for the chip 950 to send and receive data to and from a display (for example, the output unit 211 illustrated in FIG. 11). As a specific example, a result of drawing of the display information by the image processing unit 951 is output to the display via the display interface 955. Further, as another example, in the case where the result of drawing of the display information by the image processing unit 951 is stored in the storage device 953, the result of the drawing stored in the storage device 953 is output to the display via the display interface 955.

The bus interface 957 is an interface for the chip 950 to send and receive data to and from other devices and external devices. As a specific example, the data stored in the storage device 953 is transmitted to another device or an external device via the bus interface 957. Furthermore, data transmitted from another device or an external device is input to the chip 950 via the bus interface 957. Note that the data input to the chip 950 is stored in the storage device 953, for example.

The power control unit 961 is a configuration for controlling supply of power to each part of the chip 950.

The boot control unit 963 is a configuration for managing and controlling various types of processing related to boot, input/output of various types of information, and the like at the time of booting the chip 950. The boot control unit 963 corresponds to a so-called video graphics array basic input/output system (VGABIOS).

An example of the hardware configuration of the chip 950 in the case of implementing the configuration corresponding to the above-described information processing apparatus 10 as the chip 950 such as a GPU has been described in detail with reference to FIG. 18. Note that, in the present disclosure, the case of implementing the configuration as the "information processing apparatus" can include the case of implementing the configuration as a chip (in other words, components) to be incorporated in a device, as illustrated in FIG. 18, in addition to the case of implementing the configuration as one device, as illustrated in FIG. 17.

5. CONCLUSION

As described above, in the information processing system according to the embodiment of the present disclosure, the information processing apparatus includes the acquisition unit and the control unit. The acquisition unit acquires first information regarding relative movement between the viewpoint and the display information, and second information regarding the light emission period for presenting the display information to the display region. The control unit causes the display information to be presented in the display region on the basis of the first information and the second information. Furthermore, the control unit corrects the presentation position of the display information in the display region according to the relative movement between the viewpoint and the display information during the light emission period. Specifically, the control unit calculates the prediction time on the basis of the timing set as the base point for prediction and the center of the light emission period according to the second information, and corrects the presentation position of the display information in the display region on the basis of a relative positional change between the viewpoint and the display information in the prediction time.

With the above control, the information processing system according to the embodiment of the present disclosure can prevent occurrence of a situation where the presentation position of the display information is perceived to deviate from the originally assumed position, according to the control of the light emission period. Therefore, the information processing system according to the embodiment of the present disclosure can present the display information in a more favorable mode even under the situation where the light emission period regarding the presentation of the display information may change. In other word, the information processing system according to the embodiment of the present disclosure can present the display information to the user in a more favorable mode according to the change in brightness even in the case where the brightness (illuminance) of a surrounding environment has changed.

Note that the above description has focused on the case where the technology according to the embodiment of the present disclosure is applied to the head-mounted device to which the transmission-type display is applied as the output unit. However, the application of the technology is not necessarily limited. That is, the technology according to the embodiment of the present disclosure can be applied to a device assumed to be used in a situation where the display information relatively moves with respect to the viewpoint and capable of controlling the brightness of the display information according to the light emission period. As a specific example, the technology according to the embodiment of the present disclosure can be applied to a device that presents the display information to the user by projecting an image onto a projection surface as the output unit. Note that, even in this case, the technology according to the embodiment of the present disclosure can be applied regardless of whether or not the viewpoint moves as long as in the situation where the display information relatively moves with respect to the viewpoint (in other words, a projector).

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and the modifications and alterations are naturally understood to belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1)

An information processing apparatus including:

an acquisition unit configured to acquire first information regarding relative movement between a viewpoint and display information, and second information regarding a light emission period for presentation of the display information to a display region; and a control unit configured to cause the display information to be presented in the display region on the basis of the first information and the second information, in which the control unit corrects a presentation position of the display information in the display region according to the relative movement between the viewpoint and the display information in the light emission period.

(2)

The information processing apparatus according to (1), in which the control unit corrects the presentation position of the display information in the display region on the basis of a center of the light emission period according to the second information.

(3)

The information processing apparatus according to (2), in which the control unit calculates a prediction time between timing set as a base point for predicting a deviation of the presentation position perceived by a user and the center of the light emission period, and corrects the presentation position of the display information in the display region on the basis of a change in a relative position between the viewpoint and the display information in the prediction time.

(4)

The information processing apparatus according to (3), in which the control unit controls a correction amount of the presentation position of the display information in the display region according to the prediction time.

(5)

The information processing apparatus according to (3) or (4), in which the control unit calculates the prediction time on the basis of at least either a delay regarding the correction of the presentation position of the display information according to at least either a position or an orientation of the viewpoint, or a delay regarding drawing of the display information.

(6)

The information processing apparatus according to any one of (1) to (5), in which the control unit corrects the presentation position of the display information in the display region along a change direction of a relative position between the viewpoint and the display information.

(7)

The information processing apparatus according to any one of (1) to (6), in which the control unit corrects a correction amount of the presentation position of the display information in the display region according to a change amount of a relative position between the viewpoint and the display information.

(8)

The information processing apparatus according to any one of (1) to (7), in which the light emission period is controlled according to brightness of external light.

(9)

The information processing apparatus according to (8), in which the light emission period is controlled according to an adjustment amount of an influence of external light.

(10)

The information processing apparatus according to any one of (1) to (9), in which the light emission period is controlled according to a light emission output for presentation of the display information to the display region.

(11)

The information processing apparatus according to any one of (1) to (10), in which the first information is information according to a change in at least either of a position or orientation of the viewpoint.

(12)

The information processing apparatus according to any one of (1) to (11), in which the first information is information according to movement of an object displayed as the display information.

(13)

The information processing apparatus according to any one of (1) to (12), in which the display region is a display region of a transmission-type output unit.

(14)

The information processing apparatus according to (13), further including:

a support unit configured to support the display region of the output unit so as to be located in front of user's eyes in a state where the information processing apparatus is mounted on a user's head.

(15)

The information processing apparatus according to any one of (1) to (14), in which the control unit causes the display information to be superimposed on an object in a real space on the basis of the first information.

(16)

The information processing apparatus according to any one of (1) to (15), in which the control unit corrects, for each of partial regions included in the display region, the presentation position of the display information in the partial region on the basis of the relative movement between the viewpoint and the display information in the light emission period regarding the presentation of the display information to the partial region.

(17)

An information processing method including:

by a computer, acquiring first information regarding relative movement between a viewpoint and display information, and second information regarding a light emission period for presentation of the display information to a display region; and causing the display information to be presented in the display region on the basis of the first information and the second information, in which a presentation position of the display information in the display region is corrected according to the relative movement between the viewpoint and the display information in the light emission period.

(18)

A recording medium in which a program is recorded, the program for causing a computer to execute:

acquiring first information regarding relative movement between a viewpoint and display information, and second information regarding a light emission period for presentation of the display information to a display region; and causing the display information to be presented in the display region on the basis of the first information and the second information, in which a presentation position of the display information in the display region is corrected according to the relative movement between the viewpoint and the display information in the light emission period.

(19)

An information processing apparatus including:

a display control unit configured to control a display unit having optical transparency of a head-mounted display device such that a virtual object is located on the display unit at a predetermined absolute coordinate in a real space as viewed from a user who wears the display device, and an illuminance information acquisition unit configured to acquire information regarding illuminance of external light from an illuminance sensor, in which the display control unit controls the display unit such that a light emission period becomes longer as the illuminance of the external light is higher, in a case where the virtual object moves toward one direction in a display region of the display unit, the display control unit displays the virtual object at a first position in the display region as viewed from the user in a case where the illuminance of the external light is first illuminance, and displays the virtual object at a second position on a side of the one direction with respect to the first position in the display region in the horizontal direction as viewed from the user in a case where the illuminance of the external light is second illuminance higher than the first illuminance.

(20)

The information processing apparatus according to (19), further including:

a recognition processing unit configured to acquire information regarding relative movement between a viewpoint of the user and the virtual object, in which the display control unit corrects a presentation position of the virtual object on the display unit according to relative movement between the viewpoint in the light emission period and the virtual object.

REFERENCE SIGNS LIST

1 Information processing system
10 Information processing apparatus
101 Recognition processing unit
103 Drawing processing unit
105 Correction processing unit
107 Output control unit
109 Calculation unit
111 Processing block
20 Input/output device
201 Imaging unit
211 Output unit
251 First detection unit
253 Second detection unit

The invention claimed is:

1. An information processing apparatus comprising:
an acquisition unit configured to acquire first information regarding relative movement between a viewpoint and display information, and second information regarding a light emission period for presentation of the display information to a display region; and
a control unit configured to
cause the display information to be presented in the display region on a basis of the first information and the second information,
correct a presentation position of the display information in the display region according to the relative movement between the viewpoint and the display information in the light emission period,
correct the presentation position of the display information in the display region on a basis of a center of the light emission period according to the second information, and
calculate a prediction time between a timing set as a base point for predicting a deviation of the presentation position perceived by a user and the center of the light emission period, and corrects the presentation position of the display information in the display region on a basis of a change in a relative position between the viewpoint and the display information in the prediction time,
wherein the acquisition unit and the control unit are each implemented via at least one processor.

2. The information processing apparatus according to claim 1, wherein the control unit is further configured to control a correction amount of the presentation position of the display information in the display region according to the prediction time.

3. The information processing apparatus according to claim 1, wherein the control unit is further configured to calculate the prediction time on a basis of at least either a delay regarding the correction of the presentation position of the display information according to at least either a position or an orientation of the viewpoint, or a delay regarding drawing of the display information.

4. The information processing apparatus according to claim 1, wherein the control unit is further configured to correct the presentation position of the display information in the display region along a change direction of a relative position between the viewpoint and the display information.

5. The information processing apparatus according to claim 1, wherein the control unit is further configured to correct a correction amount of the presentation position of the display information in the display region according to a change amount of a relative position between the viewpoint and the display information.

6. The information processing apparatus according to claim 1, wherein the light emission period is controlled according to a brightness of external light.

7. The information processing apparatus according to claim 6, wherein the light emission period is controlled according to an adjustment amount of an influence of the external light.

8. The information processing apparatus according to claim 1, wherein the light emission period is controlled according to a light emission output for presentation of the display information to the display region.

9. The information processing apparatus according to claim 1, wherein the first information includes information according to a change in at least either of a position or an orientation of the viewpoint.

10. The information processing apparatus according to claim 1, wherein the first information includes information according to a movement of an object displayed as the display information.

11. The information processing apparatus according to claim 1, wherein the display region is a display region of a transmission-type output unit.

12. The information processing apparatus according to claim 11, further comprising:
a support configured to support the display region of the transmission-type output unit so as to be located in front of user's eyes in a state where the information processing apparatus is mounted on a user's head.

13. The information processing apparatus according to claim 1, wherein the control unit is further configured to cause the display information to be superimposed on an object in a real space on a basis of the first information.

14. The information processing apparatus according to claim 1, wherein the control unit is further configured to correct, for each of partial regions included in the display region, the presentation position of the display information in the partial region on a basis of the relative movement between the viewpoint and the display information in the light emission period regarding the presentation of the display information to the partial region.

15. An information processing method comprising:
by a computer,
acquiring first information regarding relative movement between a viewpoint and display information, and second information regarding a light emission period for presentation of the display information to a display region;
causing the display information to be presented in the display region on a basis of the first information and the second information;
correcting a presentation position of the display information in the display region according to the relative movement between the viewpoint and the display information in the light emission period;
correcting the presentation position of the display information in the display region on a basis of a center of the light emission period according to the second information; and
calculating a prediction time between a timing set as a base point for predicting a deviation of the presentation position perceived by a user and the center of the light emission period, and correcting the presentation position of the display information in the display region on a basis of a change in a relative position between the viewpoint and the display information in the prediction time.

16. A non-transitory computer-readable medium having embodied thereon a program, which when executed by a computer causes the computer to execute an information processing method, the method comprising:
- acquiring first information regarding relative movement between a viewpoint and display information, and second information regarding a light emission period for presentation of the display information to a display region;
- causing the display information to be presented in the display region on a basis of the first information and the second information;
- correcting a presentation position of the display information in the display region is corrected according to the relative movement between the viewpoint and the display information in the light emission period;
- correcting the presentation position of the display information in the display region on a basis of a center of the light emission period according to the second information; and
- calculating a prediction time between a timing set as a base point for predicting a deviation of the presentation position perceived by a user and the center of the light emission period, and correcting the presentation position of the display information in the display region on a basis of a change in a relative position between the viewpoint and the display information in the prediction time.

* * * * *